US010580195B2

(12) United States Patent
Stanard

(10) Patent No.: US 10,580,195 B2
(45) Date of Patent: Mar. 3, 2020

(54) RAY-TRIANGLE INTERSECTION TESTING WITH TETRAHEDRAL PLANES

(71) Applicant: Microsoft Technology Licensing, LLC, Redmond, WA (US)

(72) Inventor: James D. Stanard, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

(21) Appl. No.: 15/818,540

(22) Filed: Nov. 20, 2017

(65) Prior Publication Data

US 2019/0156550 A1 May 23, 2019

(51) Int. Cl.
| | |
|---|---|
| *G06T 15/06* | (2011.01) |
| *G06T 15/50* | (2011.01) |
| *G06T 17/00* | (2006.01) |
| *G06T 15/40* | (2011.01) |

(52) U.S. Cl.
CPC .............. *G06T 15/06* (2013.01); *G06T 15/40* (2013.01); *G06T 15/50* (2013.01); *G06T 15/506* (2013.01); *G06T 17/005* (2013.01)

(58) Field of Classification Search
CPC .............................. G06T 15/06; G06T 15/506
See application file for complete search history.

(56) References Cited

U.S. PATENT DOCUMENTS

| | | | |
|---|---|---|---|
| 2009/0167763 A1* | 7/2009 | Waechter | ................ G06T 15/06 345/426 |
| 2014/0028687 A1 | 1/2014 | Binder et al. | |
| 2015/0015577 A1* | 1/2015 | Mason | .................... G06T 17/10 345/420 |
| 2017/0249744 A1* | 8/2017 | Wang | ........................ G06T 7/11 |
| 2019/0057539 A1 | 2/2019 | Stanard et al. | |

OTHER PUBLICATIONS

Platis et al. "Fast ray-tetrahedron intersection using plucker coordinates." Journal of graphics tools 8.4 (2003): 37-48.*
Havel et al., "Yet Faster Ray-Triangle Intersection (Using SSE4)," *IEEE Trans. on Visualization and Computer Graphics*, vol. 16, Issue 3, 5 pp. (Jul. 2010).
Möller et al., "Fast, Minimum Storage Ray / Triangle Intersection," *Journal of Graphics Tools*, vol. 2, 7 pp. (Oct. 1997).

(Continued)

*Primary Examiner* — Ke Xiao
*Assistant Examiner* — Jed-Justin Imperial
(74) *Attorney, Agent, or Firm* — Klarquist Sparkman, LLP

(57) ABSTRACT

Various approaches to performing ray-triangle intersection tests for single triangles or clusters of triangles are presented. In some example implementations, the triangles are organized in tetrahedral clusters, and the ray-triangle intersection tests use plane data for sets of planes of the tetrahedral clusters. A triangle can be represented as three bounding planes. Further, in some example implementations, the same three bounding planes of a tetrahedral cluster can be used to represent one, two, or three triangles that define faces of that tetrahedral cluster. With this configuration, overall memory costs are reduced when the same plane data is used to represent multiple triangles, and operations to check for ray-triangle intersections are still computationally efficient.

25 Claims, 37 Drawing Sheets

(56) References Cited

OTHER PUBLICATIONS

"Ray-triangle Intersection," downloaded from the World Wide Web, 4 pp. (Oct. 2012).
Scratchapixel 2.0, "Ray Tracing: Rendering a Triangle," 52 pp. (undated—document downloaded on Nov. 20, 2017).
Wikipedia, "Plücker Coordinates," 8 pp. (document marked Nov. 2017).
International Search Report and Written Opinion dated Feb. 18, 2019, from International Patent Application No. PCT/US2018/059915, 19 pp.
Jimenez et al., "A robust segment/triangle intersection algorithm for interference tests. Efficiency study," *Computational Geometry*, vol. 43, pp. 474-492 (2010).
Segura et al., "Algorithms to Test Ray-Triangle Intersection. Comparative Study," *Journal of WSCG*, pp. 76-81 (Jan. 2001).

\* cited by examiner software 180 implementing one or more innovations for ray-triangle intersection testing with tetrahedral planes

```
float TestRayTriangleIntersection(
    out float2 bary,
    float3 RayOrigin,
    float3 RayDirection,
    float4 FacePlane,    // Coplanar with triangle
    float4 SidePlane0,   // Planes extruded from edges where the distance to the opposite vertex is '1'
    float4 SidePlane1    // (note that side planes are intentionally unnormalized)
)
{
    static const float EPSILON = 1e-10f;

// Check for back-facing triangles
    float Denom = -dot(FacePlane.xyz, RayDirection);
    if (Denom < EPSILON)
        return FLT_MAX;

// Compute intersection distance
    float T = (FacePlane.w + dot(FacePlane.xyz, RayOrigin)) / Denom;
    if (T < EPSILON)
        return FLT_MAX;

float3 PointOnPlane = RayOrigin + RayDirection * T;

bary.x = dot(SidePlane0.xyz, PointOnPlane) + SidePlane0.w;
    bary.y = dot(SidePlane1.xyz, PointOnPlane) + SidePlane1.w;

// Return T for a hit or FLT_MAX for a miss
    return min(min(bary.x, bary.y), 1.0 - bary.x - bary.y) >= 0.0 ? T : FLT_MAX;
}
```

```
float TestRayTriangleIntersection_AlternateFormulation(
    out float2 bary,
    float3 RayOrigin,
    float3 RayDirection,
    float3 TriangleOrigin,  // v2
    float3 FaceNormal,      // Normal of triangle face
    float3 SideVector0,     // Vector used to compute barycentric weight of v0
    float3 SideVector1      // Vector used to compute barycentric weight of v1
)
{
    static const float EPSILON = 1e-10f;

// Check for back-facing triangles
    float Denom = -dot(FaceNormal, RayDirection);
    if (Denom < EPSILON)
        return FLT_MAX;

// Make ray relative to triangle's origin vertex (v2)
    RayOrigin -= TriangleOrigin;

// Compute intersection distance
    float T = dot(FaceNormal, RayOrigin) / Denom;
    if (T < EPSILON)
        return FLT_MAX;

float3 PointOnPlane = RayOrigin + RayDirection * T;

bary.x = dot(SideVector0, PointOnPlane);
    bary.y = dot(SideVector1, PointOnPlane);

// Return T for a hit or FLT_MAX for a miss
    return min(bary.x, bary.y), 1.0 - bary.x - bary.y) >= 0.0 ? T : FLT_MAX;
}
```

910 Side view of triangle with a scaled side plane and isoplanes

920 Side view of triangle with a rotated side plane and isoplanes

1000 Two adjacent triangles $\{V_0, V_1, V_2\}$ and $\{V_0, V_2, V_3\}$ defining a tetrahedron 1010 Two adjacent triangles $[V_0, V_1, V_2]$ and $[V_0, V_2, V_3]$ defining a tetrahedron, and barycentric isoplanes of $V_2$

```
// Preprocessing steps for generating the scaled normals of the bounding planes used
// with tetrahedral ray-triangle intersection tests.
//
// Form the three planes that bound the triangle (V0, V1, V2)
//
// The planes are defined by six values:  a normal and a point on the plane (V0)
//
// This method should be used with lone triangles and triangles with coplanar
// neighbors that prohibit forming a tetrahedron.
//
void FormTrianglePlanes(
    float3 V0,            // The point shared by all three planes
    float3 V1,
    float3 V2, out float3 N1,        // Normal of face plane
    out float3 N2,        // Scaled normal of plane opposite V1
    out float3 N3,        // Scaled normal of plane opposite V2
)
{
    // By subtracting V0 from each vertex we not only form an edge vector
    // but also a V0-relative vertex position.
    float3 E1 = V1 - V0;
    float3 E2 = V2 - V0;

// Form normal N1 of triangle.  No need to scale
    N1 = normalize(cross(E1, E2));

// Normal N2 is perpendicular to N1 of triangle and edge 2.  Scaled by 1/distToV1.
    N2 = normalize(cross(E2, N1));
    N2 /= dot(N2, E1);

// Normal N3 is perpendicular to N1 of triangle and edge 1.  Scaled by 1/distToV2.
    N3 = normalize(cross(N1, E1));
    N3 /= dot(N3, E2);
}
```

FIG. 12b
1202

```
//
// Form three tetrahedral bounding planes for two or three triangles.
//
// The planes are defined by their normals and the intersection point (V0) of all three planes.
//
// Returns false if the tetrahedron is degenerate (flat). (Refer to FormTrianglePlanes for single
// triangle tests.)
//
bool FormTetrahedralPlanes(
    float3 V0,   // Apex vertex shared by (up to) three triangles
    float3 V1,   // 1st vertex of triangle 1; 2nd vertex of triangle 3
    float3 V2,   // 1st vertex of triangle 2; 2nd vertex of triangle 1
    float3 V3,   // 1st vertex of triangle 3; 2nd vertex of triangle 2

// Triangle 1 formed from V0, V1, V2
    out float3 N1,        // Scaled normal of triangle 1
    out bool N1Reversed,  // True if normal was negated with scale // Triangle 2 formed from V0, V2, V3
    out float3 N2,        // Scaled normal of triangle 2
    out bool N2Reversed,  // True if normal was negated with scale // Triangle 3 formed from V0, V3, V1
    out float3 N3,        // Scaled normal of triangle 3
    out bool N3Reversed,  // True if normal was negated with scale static const float EPSILON = 1e-10f;

// By subtracting V0 from each vertex we not only form an edge vector
    // but also a V0-relative vertex position.
    float3 E1 = V1 - V0;
    float3 E2 = V2 - V0;
    float3 E3 = V3 - V0;
``` continued in FIG. 12c

FIG. 12c

1203 continued from FIG. 12b

```
// Scaled normal of triangle 1.  If unsigned distance to V3 < EPSILON, we have a
// degenerate tetrahedron, and must abort.  (Revert to one-triangle testing.)
N1 = normalize(cross(E1, E2));
float DistToV3 = dot(N1, E3);
if (abs(DistToV3) < EPSILON)
    return false;
N1Reversed = DistToV3 < 0.0;
N1 /= DistToV3;

// Scaled normal of triangle 2.  If unsigned distance to V1 < EPSILON, we have a
// degenerate tetrahedron, and must abort.  (Revert to one-triangle testing.)
N2 = normalize(cross(E2, E3));
float DistToV1 = dot(N2, E1);
if (abs(DistToV1) < EPSILON)
    return false;
N2Reversed = DistToV1 < 0.0;
N2 /= DistToV1;

// Scaled normal of triangle 3.  If unsigned distance to V2 < EPSILON, we have a
// degenerate tetrahedron, and must abort.  (Revert to one-triangle testing.)
N3 = normalize(cross(E3, E1));
float DistToV2 = dot(N3, E2);
if (abs(DistToV2) < EPSILON)
    return false;
N3Reversed = DistToV2 < 0.0;
N3 /= DistToV2;

return true;
```

FIG. 14a
1401

```
// Test one triangle using tetrahedral planes
//
// 48 bytes for three planes
//
void TestRayTriangleIntersection1(
    out float T1,        // Resultant intersection time.  FLT_MAX indicates a miss
    out float2 bary1,    // Computed barycentric coordinates for V1 and V2

// Ray Data
    float3 RayOrigin,
    float3 RayDirection,

// Tetrahedral Planes
    float4 FacePlane1,   // Normalized plane containing triangle
    float4 FacePlane2,   // Plane through edge V0V2 scaled by reciprocal distance to V1
    float4 FacePlane3    // Plane through edge V0V1 scaled by reciprocal distance to V2
)
{
    static const float EPSILON = 1e-10f;

// Check for back-facing triangles
    // Compute intersection distance
    float Denom = -dot(FacePlane1.xyz, RayDirection);
    T1 = (FacePlane1.w + dot(FacePlane1.xyz, RayOrigin)) / Denom;
    T1 = min(Denom, T1) < EPSILON ? FLT_MAX : T1;

float3 PointOnPlane = RayOrigin + RayDirection * T1;

// Compute barycentric weights for V1 and V2
    bary1.x = dot(FacePlane2.xyz, PointOnPlane) + FacePlane2.w;
    bary1.y = dot(FacePlane3.xyz, PointOnPlane) + FacePlane3.w;

// Return T for a hit or FLT_MAX for a miss
    return min(min(bary1.x, bary1.y), 1.0 - bary1.x - bary1.y) >= 0.0 ? T1 : FLT_MAX;
}
```

```
// For two non-coplanar triangles that share an edge (Two faces of a tetrahedron.)
//
// Form two triangles from V0, V1, V2 and V0, V2, V3.  Compute barycentric weights
// for V1, V2, and V3 relative to both triangles.
//
// 48 bytes for three planes
//
void TestRayTriangleIntersection2(
    out float T1,       // Resultant intersection time to triangle 1.  FLT_MAX indicates a miss
    out float2 bary1,   // Computed barycentric coordinates for V1 and V2
    out float T2,       // Resultant intersection time to triangle 2.  FLT_MAX indicates a miss
    out float2 bary2,   // Computed barycentric coordinates for V2 and V3

// Ray Data
    float3 RayOrigin,
    float3 RayDirection,

// Tetrahedral Planes
    float4 FacePlane1,  // A plane containing triangle 1 scaled by ReciprocalDistanceToV3
    float4 FacePlane2,  // A plane containing triangle 2 scaled by ReciprocalDistanceToV1
    float4 FacePlane3,  // A plane containing edges V0V1 and V0V3 scaled by
ReciprocalDistanceToV2

// Additional inputs from Leaf Node
    bool Face1Reversed, // 1 bit to determine if tri1 and plane1 face the same direction
    bool Face2Reversed, // 1 bit to determine if tri2 and plane2 face the same direction
)
{
    static const float EPSILON = 1e-10f;
``` continued in FIG. 14c

FIG. 14c continued from FIG. 14b

1403

```
// Compute intersection T for face 1
float Denom1 = -dot(FacePlane1.xyz, RayDirection);
T1 = (FacePlane1.w + dot(FacePlane1.xyz, RayOrigin)) / Denom1;

// If either denom or T is less than epsilon, set T to max float
Denom1 = Face1Reversed ? -Denom1 : Denom1;
T1 = min(Denom1, T1) < EPSILON ? FLT_MAX : T1;

float3 PointOnPlane1 = RayOrigin + RayDirection * T1;

// Compute barycentric weights for V1 and V2
bary1.x = dot(FacePlane2.xyz, PointOnPlane1) + FacePlane2.w;
bary1.y = dot(FacePlane3.xyz, PointOnPlane1) + FacePlane3.w;

// Return T for a hit or FLT_MAX for a miss
T1 = min(min(bary1.x, bary1.y), 1.0 - bary1.x - bary1.y) >= 0.0 ? T1 : FLT_MAX;

// Compute intersection T for face 2
float Denom2 = -dot(FacePlane2.xyz, RayDirection);
T2 = (FacePlane2.w + dot(FacePlane2.xyz, RayOrigin)) / Denom2;

// If either denom or T is less than epsilon, set T to max float
Denom2 = Face2Reversed ? -Denom2 : Denom2;
T2 = min(Denom2, T2) < EPSILON ? FLT_MAX : T2;

float3 PointOnPlane2 = RayOrigin + RayDirection * T2;

// Compute barycentric weights for V2 and V3
bary2.x = dot(FacePlane3.xyz, PointOnPlane2) + FacePlane3.w;
bary2.y = dot(FacePlane1.xyz, PointOnPlane2) + FacePlane1.w;

// Return T for a hit or FLT_MAX for a miss
T2 = min(min(bary2.x, bary2.y), 1.0 - bary2.x - bary2.y) >= 0.0 ? T2 : FLT_MAX;
```

FIG. 14d
1404

```
// For three non-coplanar triangles that share three edges. (Three faces of a tetrahedron.)
//
// Form three triangles from V0, V1, V2 and V0, V2, V3 and V0, V3, V1. Compute barycentric
// weights for V1, V2, and V3 relative to all three triangles.
//
// 48 bytes for three planes
//
void TestRayTriangleIntersection3(
    out float T1,        // Resultant intersection time to triangle 1. FLT_MAX indicates a miss
    out float2 bary1,    // Computed barycentric coordinates for V1 and V2
    out float T2,        // Resultant intersection time to triangle 2. FLT_MAX indicates a miss
    out float2 bary2,    // Computed barycentric coordinates for V2 and V3
    out float T3,        // Resultant intersection time to triangle 3. FLT_MAX indicates a miss
    out float2 bary3,    // Computed barycentric coordinates for V3 and V1

// Ray Data
    float3 RayOrigin,
    float3 RayDirection,

// Tetrahedral Planes
    float4 FacePlane1,   // A plane containing triangle 1 scaled by ReciprocalDistanceToV3
    float4 FacePlane2,   // A plane containing triangle 2 scaled by ReciprocalDistanceToV1
    float4 FacePlane3,   // A plane containing triangle 3 scaled by ReciprocalDistanceToV2

// Additional inputs from Leaf Node
    bool Face1Reversed,  // 1 bit to determine if tri1 and plane1 face the same direction
    bool Face2Reversed,  // 1 bit to determine if tri2 and plane2 face the same direction
    bool Face3Reversed,  // 1 bit to determine if tri3 and plane3 face the same direction
)
{
    static const float EPSILON = 1e-10f;
``` continued in FIG. 14e

FIG. 14e continued from FIG. 14d

1405

```
//
// Triangle 1

// Compute intersection T for face 1
float Denom1 = -dot(FacePlane1.xyz, RayDirection);
T1 = (FacePlane1.w + dot(FacePlane1.xyz, RayOrigin)) / Denom1;

// If either denom or T is less than epsilon, set T to max float
Denom1 = Face1Reversed ? -Denom1 : Denom1;
T1 = min(Denom1, T1) < EPSILON ? FLT_MAX : T1;

float3 PointOnPlane1 = RayOrigin + RayDirection * T1;

// Compute barycentric weights for V1 and V2
bary1.x = dot(FacePlane2.xyz, PointOnPlane1) + FacePlane2.w;
bary1.y = dot(FacePlane3.xyz, PointOnPlane1) + FacePlane3.w;

// Return T for a hit or FLT_MAX for a miss
T1 = min(min(bary1.x, bary1.y), 1.0 - bary1.x - bary1.y) >= 0.0 ? T1 : FLT_MAX;

//
// Triangle 2

// Compute intersection T for face 2
float Denom2 = -dot(FacePlane2.xyz, RayDirection);
T2 = (FacePlane2.w + dot(FacePlane2.xyz, RayOrigin)) / Denom2;

// If either denom or T is less than epsilon, set T to max float
Denom2 = Face2Reversed ? -Denom2 : Denom2;
T2 = min(Denom2, T2) < EPSILON ? FLT_MAX : T2;

float3 PointOnPlane2 = RayOrigin + RayDirection * T2;
``` continued in FIG. 14f continued from FIG. 14e

```
    // Compute barycentric weights for V2 and V3
    bary2.x = dot(FacePlane3.xyz, PointOnPlane2) + FacePlane3.w;
    bary2.y = dot(FacePlane1.xyz, PointOnPlane2) + FacePlane1.w;

// Return T for a hit or FLT_MAX for a miss
    T2 = min(min(bary2.x, bary2.y), 1.0 - bary2.x - bary2.y) >= 0.0 ? T2 : FLT_MAX;

//
    // Triangle 3

// Compute intersection T for face 3
    float Denom3 = -dot(FacePlane3.xyz, RayDirection);
    T3 = (FacePlane3.w + dot(FacePlane3.xyz, RayOrigin)) / Denom3;

// If either denom or T is less than epsilon, set T to max float
    Denom3 = Face3Reversed ? -Denom3 : Denom3;
    T3 = min(Denom3, T3) < EPSILON ? FLT_MAX : T3;

float3 PointOnPlane3 = RayOrigin + RayDirection * T3;

// Compute barycentric weights for V3 and V1
    bary3.x = dot(FacePlane1.xyz, PointOnPlane3) + FacePlane1.w;
    bary3.y = dot(FacePlane2.xyz, PointOnPlane3) + FacePlane2.w;

// Return T for a hit or FLT_MAX for a miss
    T3 = min(min(bary3.x, bary3.y), 1.0 - bary3.x - bary3.y) >= 0.0 ? T3 : FLT_MAX;
}
```

```
// Alternative formulation that specifies the position of the vertex common to all three
// planes.
//
// Test one triangle using tetrahedral planes
//
// 48 bytes for three planes
//
void TestRayTriangleIntersection1_AlternateFormulation(
    out float T1,      // Resultant intersection time.  FLT_MAX indicates a miss
    out float2 bary1,  // Computed barycentric coordinates for V1 and V2

// Ray Data
    float3 RayOrigin,
    float3 RayDirection,

// Tetrahedral Planes
    float3 Vertex0,      // The position of the vertex shared by all three faces
    float3 FaceNormal1,  // The face normal of triangle 1
    float3 FaceNormal2,  // The face normal of triangle 2 scaled by ReciprocalDistanceToV1
    float3 FaceNormal3,  // The face normal of triangle 3 scaled by ReciprocalDistanceToV2
)
{
    static const float EPSILON = 1e-10f;

// Make ray relative Vertex0
    RayOrigin -= Vertex0;
``` continued in FIG. 15b

```
// Check for back-facing triangles
// Compute intersection distance
float Denom = -dot(FaceNormal1.xyz, RayDirection);
T1 = dot(FaceNormal1.xyz, RayOrigin) / Denom;
T1 = min(Denom, T1) < EPSILON ? FLT_MAX : T1;

float3 PointOnPlane = RayOrigin + RayDirection * T1;

// Compute barycentric weights for V1 and V2
bary1.x = dot(FaceNormal2.xyz, PointOnPlane);
bary1.y = dot(FaceNormal3.xyz, PointOnPlane);

// Return T for a hit or FLT_MAX for a miss
return min(min(bary1.x, bary1.y), 1.0 - bary1.x - bary1.y) >= 0.0 ? T1 : FLT_MAX;
}
``` continued from FIG. 15a

FIG. 15c
1503

```
// Alternative formulation that specifies the position of the vertex common to all three planes.
//
// Form two triangles from V0, V1, V2 and V0, V2, V3.  Compute barycentric weights
// for V1, V2, and V3 relative to both triangles.
//
// 48 bytes for three planes void TestRayTriangleIntersection2_AlternateFormulation(
    out float T1,      // Resultant intersection time to triangle 1.  FLT_MAX indicates a miss
    out float2 bary1,  // Computed barycentric coordinates for V1 and V2
    out float T2,      // Resultant intersection time to triangle 2.  FLT_MAX indicates a miss
    out float2 bary2,  // Computed barycentric coordinates for V2 and V3

// Ray Data
    float3 RayOrigin,
    float3 RayDirection,

// Tetrahedral Planes
    float3 Vertex0,       // The position of the vertex shared by all three faces
    float3 FaceNormal1,   // The face normal of triangle 1 scaled by ReciprocalDistanceToV3
    float3 FaceNormal2,   // The face normal of triangle 2 scaled by ReciprocalDistanceToV1
    float3 FaceNormal3,   // The face normal of triangle 3 scaled by ReciprocalDistanceToV2

// Additional inputs from Leaf Node
    bool Face1Reversed,   // 1 bit to determine if tri1 and plane1 face the same direction
    bool Face2Reversed,   // 1 bit to determine if tri2 and plane2 face the same direction
    )
{
    static const float EPSILON = 1e-10f;

// Make ray relative Vertex0
    RayOrigin -= Vertex0;
``` continued in FIG. 15d

FIG. 15d continued from FIG. 15c

1504

```
// Triangle 1
// Compute intersection T for face 1
float Denom1 = -dot(FaceNormal1.xyz, RayDirection);
T1 = dot(FaceNormal1.xyz, RayOrigin) / Denom1;

// If either denom or T is less than epsilon, set T to max float
Denom1 = Face1Reversed ? -Denom1 : Denom1;
T1 = min(Denom1, T1) < EPSILON ? FLT_MAX : T1;

float3 PointOnPlane1 = RayOrigin + RayDirection * T1;

// Compute barycentric weights for V1 and V2
bary1.x = dot(FaceNormal2.xyz, PointOnPlane1);
bary1.y = dot(FaceNormal3.xyz, PointOnPlane1);

// Return T for a hit or FLT_MAX for a miss
T1 = min(min(bary1.x, bary1.y), 1.0 - bary1.x - bary1.y) >= 0.0 ? T1 : FLT_MAX;

// Triangle 2
// Compute intersection T for face 2
float Denom2 = -dot(FaceNormal2.xyz, RayDirection);
T2 = dot(FaceNormal2.xyz, RayOrigin) / Denom2;

// If either denom or T is less than epsilon, set T to max float
Denom2 = Face2Reversed ? -Denom2 : Denom2;
T2 = min(Denom2, T2) < EPSILON ? FLT_MAX : T2;

float3 PointOnPlane2 = RayOrigin + RayDirection * T2;

// Compute barycentric weights for V2 and V3
bary2.x = dot(FaceNormal3.xyz, PointOnPlane2);
bary2.y = dot(FaceNormal1.xyz, PointOnPlane2);

// Return T for a hit or FLT_MAX for a miss
T2 = min(min(bary2.x, bary2.y), 1.0 - bary2.x - bary2.y) >= 0.0 ? T2 : FLT_MAX;
```

```
// Alternative formulation that specifies the position of the vertex common to all three
// planes.
//
// For three non-coplanar triangles that share three edges. (Three faces of a tetrahedron.)
//
// Form three triangles from V0, V1, V2 and V0, V2, V3 and V0, V3, V1. Compute barycentric
// weights for V1, V2, and V3 relative to all three triangles.
//
// 48 bytes for three planes
//
void TestRayTriangleIntersection3_AlternateFormulation(
    out float  T1,     // Resultant intersection time to triangle 1.  FLT_MAX indicates a miss
    out float2 bary1,  // Computed barycentric coordinates for V1 and V2
    out float  T2,     // Resultant intersection time to triangle 2.  FLT_MAX indicates a miss
    out float2 bary2,  // Computed barycentric coordinates for V2 and V3
    out float  T3,     // Resultant intersection time to triangle 3.  FLT_MAX indicates a miss
    out float2 bary3,  // Computed barycentric coordinates for V3 and V1

// Ray Data
    float3 RayOrigin,
    float3 RayDirection,

// Tetrahedral Planes
    float3 Vertex0,      // The position of the vertex shared by all three faces
    float3 FaceNormal1,  // The face normal of triangle 1 scaled by ReciprocalDistanceToV3
    float3 FaceNormal2,  // The face normal of triangle 2 scaled by ReciprocalDistanceToV1
    float3 FaceNormal3,  // The face normal of triangle 3 scaled by ReciprocalDistanceToV2
``` continued in FIG. 15f

FIG. 15f continued from FIG. 15e

```
    // Additional inputs from Leaf Node
    bool Face1Reversed, // 1 bit to determine if tri1 and plane1 face the same direction
    bool Face2Reversed, // 1 bit to determine if tri2 and plane2 face the same direction
    bool Face3Reversed, // 1 bit to determine if tri3 and plane3 face the same direction
)
{
    static const float EPSILON = 1e-10f;

// Make ray relative Vertex0
    RayOrigin -= Vertex0;

//
    // Triangle 1

// Compute intersection T for face 1
    float Denom1 = -dot(FaceNormal1.xyz, RayDirection);
    T1 = dot(FaceNormal1.xyz, RayOrigin) / Denom1;

// If either denom or T is less than epsilon, set T to max float
    Denom1 = Face1Reversed ? -Denom1 : Denom1;
    T1 = min(Denom1, T1) < EPSILON ? FLT_MAX : T1;

float3 PointOnPlane1 = RayOrigin + RayDirection * T1;

// Compute barycentric weights for V1 and V2
    bary1.x = dot(FaceNormal2.xyz, PointOnPlane1);
    bary1.y = dot(FaceNormal3.xyz, PointOnPlane1);

// Return T for a hit or FLT_MAX for a miss
    T1 = min(min(bary1.x, bary1.y), 1.0 - bary1.x - bary1.y) >= 0.0 ? T1 : FLT_MAX;
```

1507 continued from FIG. 15f

```
// Triangle 2
// Compute intersection T for face 2
float Denom2 = -dot(FaceNormal2.xyz, RayDirection);
T2 = dot(FaceNormal2.xyz, RayOrigin) / Denom2;

// If either denom or T is less than epsilon, set T to max float
Denom2 = Face2Reversed ? -Denom2 : Denom2;
T2 = min(Denom2, T2) < EPSILON ? FLT_MAX : T2;

float3 PointOnPlane2 = RayOrigin + RayDirection * T2;

// Compute barycentric weights for V2 and V3
bary2.x = dot(FaceNormal3.xyz, PointOnPlane2);
bary2.y = dot(FaceNormal1.xyz, PointOnPlane2);

// Return T for a hit or FLT_MAX for a miss
T2 = min(min(bary2.x, bary2.y), 1.0 - bary2.x - bary2.y) >= 0.0 ? T2 : FLT_MAX;

// Triangle 3
// Compute intersection T for face 3
float Denom3 = -dot(FacePlane3.xyz, RayDirection);
T3 = dot(FacePlane3.xyz, RayOrigin) / Denom3;

// If either denom or T is less than epsilon, set T to max float
Denom3 = Face3Reversed ? -Denom3 : Denom3;
T3 = min(Denom3, T3) < EPSILON ? FLT_MAX : T3;

float3 PointOnPlane3 = RayOrigin + RayDirection * T3;

// Compute barycentric weights for V3 and V1
bary3.x = dot(FaceNormal1.xyz, PointOnPlane3);
bary3.y = dot(FaceNormal2.xyz, PointOnPlane3);

// Return T for a hit or FLT_MAX for a miss
T3 = min(min(bary3.x, bary3.y), 1.0 - bary3.x - bary3.y) >= 0.0 ? T3 : FLT_MAX;
```

FIG. 16a
1601

```
//
// A helper function for intersecting with a single triangle that must be back-face rejected.
//
bool TestTriangleOneSided(
    inout uint ClosestTriangle,  // Triangle ID of closest intersection
    inout float ClosestT,         // T of closest intersection
    inout float2 ClosestBary,     // Barycentric coordinates for hit triangle float3 RayOrigin,             // Ray origin relative to first vertex (V0)
    float3 RayDirection, uint TriangleID,              // The high bit is set if the face should be reversed for culling float3 FaceNormal,            // The normal of this triangle
    float3 OppNormal0,            // The normal of the triangle opposite second vertex scaled by 1/Dist
    float3 OppNormal1,            // The normal of the triangle opposite third vertex scaled by 1/Dist
    )
{
    static const float EPSILON = 1e-10f;

// Compute denominator for T formula
    float Denom = -dot(FaceNormal.xyz, RayDirection);

// Check for back-face (non-positive denominator)
    uint FaceReverseSignBit = TriangleID & 0x80000000;
    if (asfloat(asuint(Denom) ^ FaceReverseSignBit) < EPSILON)
        return false;

// Compute distance 'T' to intersection point
    float T = dot(FaceNormal.xyz, RayOrigin) / Denom;

// If T is negative or greater than the closest T value, we reject this triangle
    if (T < EPSILON || T > ClosestT)
        return false;
``` continued in FIG. 16b

FIG. 16b continued from FIG. 16a

```
    // Get plane intersection point to test its bounds
    float3 PointOnPlane = RayOrigin + RayDirection * T;

// Compute barycentric weights for second vertex and third vertex
    float baryX = dot(OppNormal0.xyz, PointOnPlane);
    float baryY = dot(OppNormal1.xyz, PointOnPlane);
    float baryZ = 1.0 - baryX - baryY;

// If all barycentric weights are >= 0, we have a hit.
    if (min(min(baryX, baryY), baryZ) >= 0.0)
    {
        ClosestTriangle = TriangleID & 0x7FFFFFFF;
        ClosestT = T;
        ClosestBary = float2(baryX, baryY);
        return true;
    } return false;
}
```

```
//
// Form three triangles from V0, V1, V2 and V0, V2, V3 and V0, V3, V1. Computes which triangle,
// if any, is intersected (and is not back-facing). Note that with back-face rejection, the ray
// can only intersect one of the triangles. The two barycentric weights computed are for the
// two vertices after V0 in CCW order.
//
void TestRayTetrahedronIntersection_CullBack_faces(
    inout uint Triangle Hit,     // Triangle ID of closest intersection
    inout float ClosestT,        // Intersection time (distance) to triangle
    inout float2 ClosestBary,    // Barycentric coordinates for 2nd and 3rd vertex of triangle // Ray Data
    float3 RayOrigin,
    float3 RayDirection, // Tetrahedral planes. All planes pass through V0, which is treated as the origin.
    float3 V0,              // The position of the vertex shared by all three faces
    float3 FaceNormal1,     // The face normal of triangle 1 scaled by ReciprocalDistanceToV3
    float3 FaceNormal2,     // The face normal of triangle 2 scaled by ReciprocalDistanceToV1
    float3 FaceNormal3,     // The face normal of triangle 3 scaled by ReciprocalDistanceToV2

// IDs for each triangle. If zero, the triangle is not to be tested. The high bit of
    // each ID indicates if the plane normal was reversed by the scale.
    uint Triangle1ID,
    uint Triangle2ID,
    uint Triangle3ID,
    )
``` continued in FIG. 16d

FIG. 16d continued from FIG. 16c

1604

```
{
    // Make ray relative V0
    RayOrigin -= V0;

//
    // Triangle 1
    //
    if (TestTriangleOneSided(TriangleHit, ClosestT, ClosestBary, RayOrigin, RayDirection,
        Triangle1ID, FaceNormal1, FaceNormal2, FaceNormal3) || !Triangle2ID)
        return;

//
    // Triangle 2
    //
    if (TestTriangleOneSided(TriangleHit, ClosestT, ClosestBary, RayOrigin, RayDirection,
        Triangle2ID, FaceNormal2, FaceNormal3, FaceNormal1) || !Triangle3ID)
        return;

//
    // Triangle 3
    //
    TestTriangleOneSided(TriangleHit, ClosestT, ClosestBary, RayOrigin, RayDirection,
        Triangle3ID, FaceNormal3, FaceNormal1, FaceNormal2);
}
```

FIG. 16e
1605

```
// A helper function for intersecting with a single triangle that is two-sided.
//
void TestTriangleTwoSided(
    inout uint   ClosestTriangle,  // Triangle ID of closest intersection
    inout float  ClosestT,         // T of closest intersection
    inout float2 ClosestBary,      // Barycentric coordinates for hit triangle const float3 RayOrigin,        // Ray origin relative to first vertex (V0)
    const float3 RayDirection, const uint   TriangleID,       // ID for this triangle
    const float3 FaceNormal,       // The normal of this triangle
    const float3 OppNormal0,       // The normal of the plane opposite second vertex scaled by 1/Dist
    const float3 OppNormal1        // The normal of the plane opposite third vertex scaled by 1/Dist
){
    static const float EPSILON = 1e-10f;

// Check for back-face (non-positive denominator)
    float Denom = -dot(FaceNormal.xyz, RayDirection);
    if (abs(Denom) < EPSILON)
        return;

// Compute distance 'T' to intersection point
    float T = dot(FaceNormal.xyz, RayOrigin) / Denom;

// If T is negative or greater than the current T value, we reject this triangle
    if (T < EPSILON || T > ClosestT)
        return;
``` continued in FIG. 16f continued from FIG. 16e

```
// Get plane intersection point to test its bounds
float3 PointOnPlane = RayOrigin + RayDirection * T;

// Compute barycentric weights for second vertex and third vertex
float baryX = dot(OppNormal0.xyz, PointOnPlane);
float baryY = dot(OppNormal1.xyz, PointOnPlane);
float baryZ = 1.0 - baryX - baryY;

// If all barycentric weights are >= 0, we have a hit.
if (min(min(baryX, baryY), baryZ) >= 0.0)
{
    ClosestTriangle = TriangleID & 0x7FFFFFFF;
    ClosestT = T;
    ClosestBary = float2(baryX, baryY);
}
}
```

```
// Form three triangles from V0, V1, V2 and V0, V2, V3 and V0, V3, V1. Computes the closest
// intersection, if any, of the triangles. The two barycentric weights computed are for the
// two vertices after V0 in CCW order.
//
void TestRayTetrahedronIntersection_NoBack-faceCulling(
    inout uint TriangleHit,           // The ID of the closest hit so far
    inout float ClosestT,             // Intersection time (distance) to triangle
    inout float2 ClosestBary,         // Barycentric coordinates for 2nd and 3rd vertex of triangle // Ray Data
    float3 RayOrigin,
    float3 RayDirection, // Tetrahedral planes.  All planes pass through V0, which is treated as the origin.
    float3 V0,               // The position of the vertex shared by all three faces
    float3 FaceNormal1,      // The face normal of triangle 1 scaled by ReciprocalDistanceToV3
    float3 FaceNormal2,      // The face normal of triangle 2 scaled by ReciprocalDistanceToV1
    float3 FaceNormal3,      // The face normal of triangle 3 scaled by ReciprocalDistanceToV2

// IDs for each triangle.  If zero, the triangle is not to be tested.  The high bit of
    // each ID indicates if the face normal was reversed by the scale.
    uint Triangle1ID,
    uint Triangle2ID,
    uint Triangle3ID,
)
``` continued in FIG. 16h

FIG. 16h
1608 continued from FIG. 16g

```
{
    // Make ray relative V0
    RayOrigin -= V0;

//
    // Triangle 1
    //
    TestTriangleTwoSided(TriangleHit, ClosestT, ClosestBary, RayOrigin, RayDirection,
        Triangle1ID, FaceNormal1, FaceNormal2, FaceNormal3);

if (Triangle2ID == 0)
        return;

//
    // Triangle 2
    //
    TestTriangleTwoSided(TriangleHit, ClosestT, ClosestBary, RayOrigin, RayDirection,
        Triangle2ID, FaceNormal2, FaceNormal3, FaceNormal1);

if (Triangle3ID == 0)
        return;

//
    // Triangle 3
    //
    TestTriangleTwoSided(TriangleHit, ClosestT, ClosestBary, RayOrigin, RayDirection,
        Triangle3ID, FaceNormal3, FaceNormal1, FaceNormal2);
}
```

RAY-TRIANGLE INTERSECTION TESTING WITH TETRAHEDRAL PLANES

BACKGROUND

In a three-dimensional ("3D") computer graphics environment, ray tracing can be used to generate an image from the perspective of a virtual camera or other viewing point. The image includes multiple picture elements ("pixels") through which rays from the viewing point pass and continue into the 3D computer graphics environment. For a given pixel, the path of the ray (primary ray) that passes through the pixel from the viewing point is traced until it intersects with an object in the environment. The surface of the object can have a color associated with it at the intersection point, as well as values that indicate albedo (reflectivity), scattering, refraction, diffusion or another material property. Such values can be interpolated, for example, between values of properties of vertices of the object. At the intersection point, depending on the surface of the object, the ray can be reflected or refracted within the environment, or it can generate diffuse rays, to simulate optical effects such as reflection, refraction/translucence, scattering, and dispersion. The angle of the surface at the intersection point can be determined by interpolating between norms of vertices of the object, or the angle of the surface at the intersection point can be estimated as the angle of a face plane of the object. A shadow ray can be generated, in the direction of a light source, to simulate optical effects such as shading from the light source (blocking of light from the light source). Such newly generated rays (secondary rays) are similarly traced in the environment, and can generate other rays (tertiary rays), and so on. Successive rays can be generated, for example, until a threshold number of stages is reached or threshold distance is traveled. Ultimately, the value of the given pixel depends on the color of the surface of the object at the intersection point and results reported back from secondary rays, which may in turn depend on results reported back from tertiary rays, and so on, so as to simulate shadows, reflected light, refracted light, and other effects at the intersection point. Thus, in addition to the color of the surface at the intersected point, the value of the given pixel can depend on the incoming light and material properties of the object at the intersection point.

By focusing on rays that reach the viewing point, ray tracing is much simpler than tracing the paths of rays of light from light source(s) in the environment, so as to find which ones reach the viewing point. Even so, ray tracing is computationally intensive. An image can include hundreds of thousands of pixels, or even millions of pixels. Images can be rendered at a rate of 30 frames per second or higher. Typically, for each pixel, the ray that passes through the pixel is tested to see if it intersects with some subset of the objects in the environment. The environment can include numerous complex objects, which can dynamically change from image to image.

To simplify representation of the objects in the environment, complex objects can be represented with simpler geometric objects such as triangles. For example, the surface of an object can be represented as a set of triangles fitted to the surface. In addition to having vertices and/or edges that define its shape and position in the environment, a given triangle can have an associated color and material properties (or have colors and material properties associated with the vertices of the given triangle, for use in interpolation for intersection points within the given triangle). Any surface can be approximated with a set of triangles. To approximate curves or complex shapes, successively smaller triangles can be used to provide finer levels of detail.

Although geometric objects such as triangles provide a convenient way to represent complex objects in the environment, the resulting representation can include a very large number of geometric objects. For example, a scene can include hundreds of thousands or even millions of geometric objects. These geometric objects can be enclosed in successively larger groups, which are represented in a bounding volume hierarchy ("BVH"). A BVH is tree-structured. Geometric objects in the environment are wrapped in bounding volumes. Bounding volumes enclose geometric objects for the leaf nodes of the tree for the BVH. The leaf nodes are grouped in small sets, which typically correspond to adjoining regions of the environment. A non-leaf node (also called an interior node) encloses a small set of leaf nodes. Sets of non-leaf (interior) nodes are, in turn, enclosed within successively larger bounding volumes for shallower non-leaf (interior) nodes, in a recursive manner, until a "root" node of the BVH encloses all of the non-leaf nodes and leaf nodes. A BVH can be organized as a binary tree (with each non-leaf node having two child nodes), as a quad tree (with each non-leaf node having four child nodes), as an oct tree (with each non-leaf node having eight child nodes), or in some other way.

To test for intersections of a ray with geometric objects in a 3D computer graphics environment, the ray can be tested against a BVH. If there is an intersection between the ray and the bounding volume for the root node, the ray can be tested against the bounding volumes for the respective child nodes of the root node, and so on. In this way, the ray can be tested against successively smaller, enclosed bounding volumes. Testing for an intersection between the ray and a bounding volume is relatively simply if the shape of the bounding volume is a sphere or box. When there is an intersection between the ray and the bounding volume of a leaf node, the ray can be tested for intersections with the geometric objects, e.g., triangles, enclosed by the bounding volume of the leaf node. This is an example of ray-triangle intersection testing.

At any stage, if a ray does not intersect a given bounding volume, further tests against bounding volumes (and geometric objects) within the given bounding volume can be skipped. Stated differently, bounding volumes for child nodes need not be evaluated if the bounding volume for their parent node is not intersected. Similarly, geometric objects (such as triangles) in a leaf node need not be evaluated if the bounding volume for the leaf node is not intersected.

A ray-triangle intersection test is used when a ray is tested for intersections with one or more triangles. There are many different approaches to performing ray-triangle testing in various application areas. Ray-triangle intersection testing is commonly used in computer graphics. In addition, ray-triangle intersection testing is widely used in scene modelling, physical simulations, collision detections, visibility checking, and various real-time processing scenarios. In some previous approaches, for example, given the vertices and/or edges of a triangle, a ray-triangle test determines whether a given ray intersects the triangle. The ray has an origin and a direction. The ray-triangle intersection test finds the distance from the ray origin to the intersection point, as well as whether the intersection point is inside the triangle that is defined by the vertices/edges. Despite attempts to reduce the complexity of ray-triangle intersection testing in previous approaches, ray-triangle intersection testing remains a very computationally-intensive process.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In summary, the Detailed Description presents various approaches to performing ray-triangle intersection tests for single triangles or clusters of triangles. In some example implementations, the triangles are organized in tetrahedral clusters, and the ray-triangle intersection tests use plane data for sets of planes of the tetrahedral clusters. In typical previous approaches to performing ray-triangle intersection tests, vertex data used to represent a triangle is usually stored with 9 floating-point values ("floats"). This provides a compact representation in memory but the operations to check for a ray-triangle intersection are relatively computationally expensive. In contrast, in some example implementations, a triangle is represented as three bounding planes, which are stored with 12 floats. For a single triangle, this consumes more memory (12 floats versus 9 floats) but the operations to check for a ray-triangle intersection are computationally more efficient. Further, in some example implementations, the same three bounding planes of a tetrahedral cluster can be used to represent one, two, or three triangles that define faces of that tetrahedral cluster. With this configuration, overall memory costs are reduced when the same plane data is used for multiple triangles, and operations to check for ray-triangle intersections are still computationally efficient.

According to a first set of innovations described herein, a ray tracing tool implemented in a computer system performs ray-triangle intersection tests with plane data during ray tracing in a computer-represented environment. The environment includes multiple triangles, for example, organized in a bounding volume hierarchy ("BVH"). The ray tracing tool selects a given triangle. A face plane includes the selected triangle, and each of multiple side planes includes an edge of the selected triangle. In some example implementations, the face plane and side planes include faces of a tetrahedral cluster. Plane data for the face plane and the side planes can include, for each plane, a normal vector (or "normal") of the plane and a distance from a world origin (e.g., in the computer-represented environment) to the plane. Or, plane data for the face plane and side planes can include a vertex shared between the face plane and the side planes as well as, for each plane, a normal of the plane. Specifying a shared vertex (instead of distances from a world origin) can improve the precision of results. In any case, the ray tracing tool uses plane data for the face plane to determine an intersection point between a ray and the face plane. The ray tracing tool uses plane data for the multiple side planes to compute barycentric weights of the intersection point, and then uses the barycentric weights to determine if the intersection point is inside the selected triangle. In this way, the ray tracing tool can find the intersection point in a computationally-efficient manner.

According to a second set of innovations described herein, a ray tracing tool implemented in a computer system computes plane data for use in ray-triangle intersection tests during ray tracing in a computer-represented environment. The environment includes multiple triangles, for example, organized in a BVH. The ray tracing tool identifies multiple non-coplanar adjacent triangles in a tetrahedral cluster. The identified triangles define at least some faces of the tetrahedral cluster. The identified triangles are adjacent in that any two of them share at least one edge of the tetrahedral cluster. A different plane, among a set of planes of the tetrahedral cluster, includes each of the identified triangles. For example, the set of planes of the tetrahedral cluster can be three planes that include three identified triangles, respectively. Or, as another example, the set of planes of the tetrahedral cluster can be two planes that include two identified triangles and another plane that includes a non-identified, notional triangle having an edge from each of the two identified triangles. In other (special) cases, the set of planes of the tetrahedral cluster can be one plane that includes one identified triangle and two other planes that include edges from the identified triangle.

The ray tracing tool represents the tetrahedral cluster using plane data for the set of planes of the tetrahedral cluster. The identified triangles are non-coplanar—none of the planes of the tetrahedral cluster are parallel to each other. In general, the plane data for the set of planes of the tetrahedral cluster includes, for each plane of the set of planes of the tetrahedral cluster, a normal of the plane. For each of the planes in the set of planes of the tetrahedral cluster, the ray tracing tool can scale the plane (e.g., by scaling the normal) by a scaling factor based on a distance between the plane and a vertex that is in the tetrahedral cluster but not in the plane (e.g., to make the distance to be one between the plane and vertex). Depending on implementation, the plane data can include a vertex in the tetrahedral cluster or, for each plane of the set of planes of the tetrahedral cluster, a distance from a world origin to the plane. The plane data can also include unique triangle identifiers for the respective identified triangles and/or property values for the respective identified triangles (or their vertices). The ray tracing tool stores the plane data for the set of planes of the tetrahedral cluster. When a tetrahedral cluster includes two or three identified triangles, by storing the same plane data for the planes of the tetrahedral cluster, overall memory costs can be reduced.

According to a third set of innovations described herein, a ray tracing tool implemented in a computer system performs ray-triangle intersection tests using plane data during ray tracing in a computer-represented environment. The environment includes multiple triangles, for example, organized in a BVH. The ray tracing tool selects multiple non-coplanar adjacent triangles in a tetrahedral cluster. A different plane, among a set of planes of the tetrahedral cluster, includes each of the selected triangles. The ray tracing tool uses plane data (e.g., defined as described for the second set of innovations) for the set of planes of the tetrahedral cluster to determine intersection points and barycentric weights for the intersection points in the selected triangles. In particular, for each of the selected triangles, the ray tracing tool uses plane data for the plane that includes the selected triangle to determine an intersection point between a ray and the plane that includes the selected triangle. The ray tracing tool uses plane data for other planes in the set of planes of the tetrahedral cluster to compute barycentric weights of the intersection point, and then uses the barycentric weights to determine if the intersection point is inside the selected triangle. In this way, the ray tracing tool can perform operations to check for ray-triangle intersections in a computationally efficient manner.

According to a fourth set of innovations described herein, a ray tracing tool implemented in a computer system performs ray-triangle intersection test with tetrahedral bounding planes in a computer-represented environment. The environment includes multiple triangles enclosed in a BVH. The ray tracing tool selects one triangle in a cluster. A tetrahedron is defined by constructing two or more non-coplanar planes for the cluster, each of the non-coplanar planes sharing an edge with the selected triangle. The constructed planes can be either perpendicular or non-perpendicular to the plane that includes the selected triangle. A scaling factor can be computed for a plane based on the distance between the plane and the opposite vertex that is in the cluster but not in the plane. The plane can then be scaled by the corresponding scaling factor. Using the plane data for the plane that includes the selected triangle, the ray tracing tool computes the distance from the ray origin to the intersection point in the plane that includes the selected triangle. Using plane data for the one or more non-coplanar planes for the cluster, the ray tracing tool then computes the barycentric weights of the intersection point and further determines if the intersection point is inside the selected triangle.

Triangles can be grouped into a cluster. When two triangles are selected for a cluster, the two triangles share a common edge, and each has one separate vertex. If three triangles are selected for a cluster, all three triangles share one common vertex, and each shares one edge with each of the other two. When performing ray-triangle intersection testing, a common vertex can be selected for either a cluster with two triangles or a cluster with three triangles. Scaling factors can be calculated for planes including the triangles based on the distance between an edge (the one does not include the common vertex) and the common vertex. The distances can be scaled between the selected triangles and the common vertex. In this way, bounding planes of a tetrahedron can be formed with four vertices of the two or three triangles. Each side of the tetrahedron can be used to compute the barycentric weight for its opposing vertex.

In some example implementations, plane data for the set of planes of the tetrahedral cluster includes a shared vertex and a normal per plane. In this case, a local origin defined by the shared vertex is used instead of the world origin (e.g., a location of the computer-represented environment from which distances to the respective planes are calculated). The planes are thus defined relative to the local origin. For example, one of the vertices, or the common vertex of all the triangles, e.g., $V_0$, can be set as the local origin. The distances from the respective planes to the origin become zero. In this formulation, the tetrahedral planes are defined as the planes containing the vertex $V_0$ with normal vectors scaled by the reciprocal distance to their opposing vertices. When intersecting a ray with the $V_0$-relative planes, the ray tracing tool can simply subtract $V_0$ from the ray origin, omitting the distance terms from plane-distance equations. By defining the planes with the local origin in this manner (instead of using the in-the-world space), more precision can be found with floating-point numbers since the planes are close to the local zero.

In the various sets of innovations described herein, the ray tracing tool can be implemented in various ways. For example, the computer system can have a single processing unit (e.g., graphics processing unit) with one or more threads that perform ray-triangle intersection tests. Or, the computer system can have multiple processing units (e.g., including at least one graphics processing unit), which perform ray-triangle intersection tests for different rays in parallel with different threads of a given processing unit.

The innovations described herein can be implemented as part of a method, as part of a computer system configured to perform the method or as part of a tangible computer-readable media storing computer-executable instructions for causing a computer system, when programmed thereby, to perform the method. The various innovations can be used in combination or separately. The foregoing and other objects, features, and advantages of the invention will become more apparent from the following detailed description, which proceeds with reference to the accompanying figures.

BRIEF DESCRIPTION OF THE DRAWINGS

FIGS. 8a and 8b are code listings for example implementations of ray-triangle intersection testing with pre-computed plane data.

FIGS. 12a-12c are code listings for an example implementation of pre-computing plane data.

FIGS. 14a-14f are code listings for a first example implementation of ray-triangle intersection testing with plane data for tetrahedral bounding planes.

FIGS. 15a-15g are code listings for a second example implementation of ray-triangle intersection testing with plane data for tetrahedral bounding planes.

FIGS. 16a-16h are code listings for a third example implementation of ray-triangle intersection testing with plane data for tetrahedral bounding planes.

DETAILED DESCRIPTION

Figure 1:
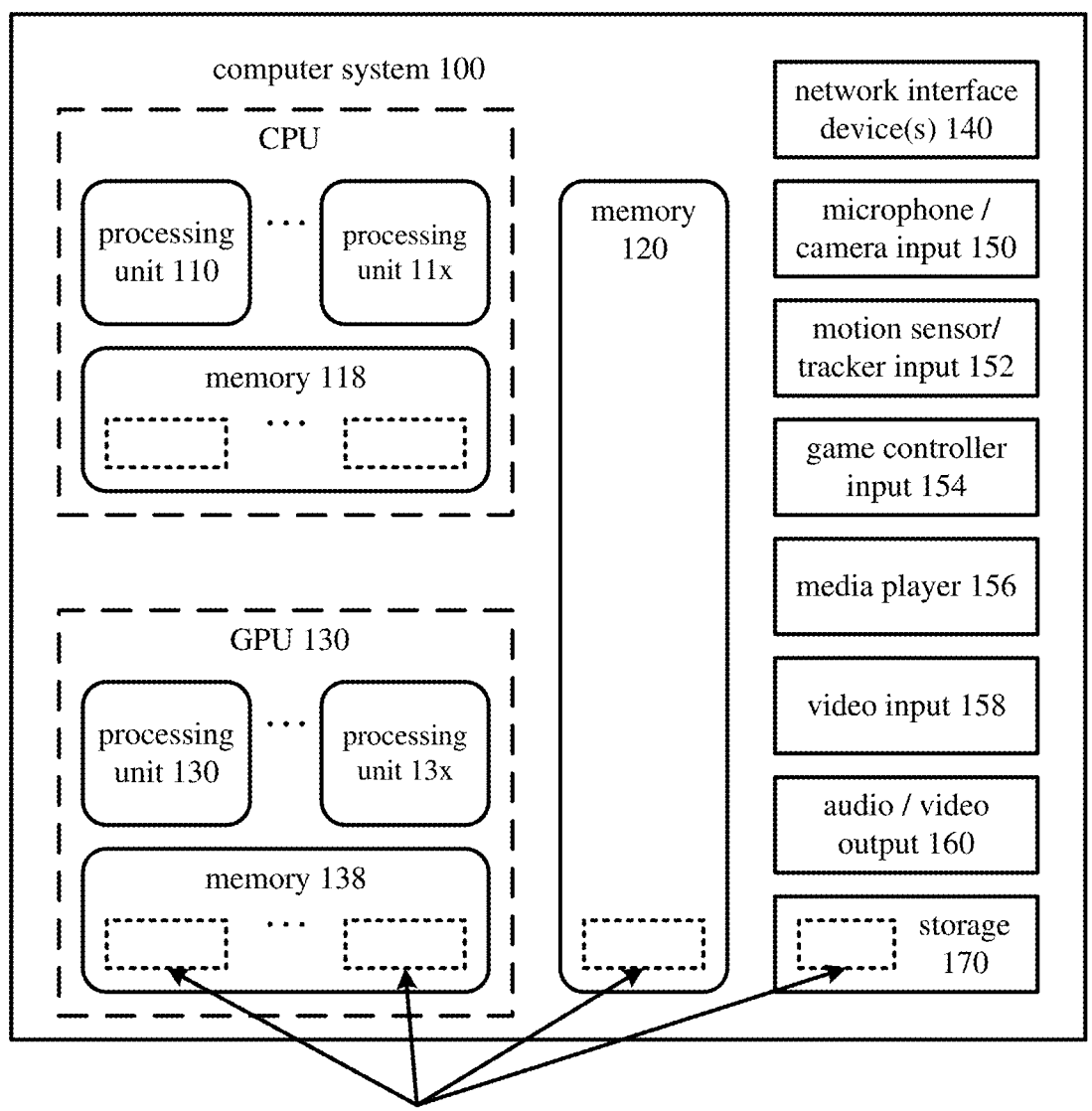
FIG. 1 is a diagram illustrating an example computer system in which one or more of the approaches described herein can be implemented.

Various approaches to performing ray-triangle intersection tests for single triangles or clusters of triangles are presented herein. In some example implementations, the triangles are organized in tetrahedral clusters, and the ray-triangle intersection tests use plane data for sets of planes of the tetrahedral clusters. In many cases, the approaches dramatically reduce overall memory cost for storing plane data that specifies the triangles while improving the computational efficiency of ray-triangle intersection testing. For example, for ray-triangle intersection testing scenarios in which three triangles share the same three bounding planes, memory costs can be reduced significantly while operations are still computationally efficient.

As used herein, the term "ray tracing" encompasses light ray tracing operations for rendering or special effects in a 3D computer graphics environment. The term "ray tracing" also encompasses other types of applications, such as tracing of rays for collision detection in a physics simulation environment, visibility checking in a model of a real-world scene, tracing of rays to model acoustic phenomena in a sound environment, or tracing of rays in another computer-represented environment. The computer-represented environment can represent a real-world scene (e.g., constructed from imaging/scanning of a real-world scene), represent a synthetic, virtual scene (e.g., constructed entirely from graphics processing tools, or created for a virtual reality application), or represent a hybrid scene that blends results of imaging/scanning of a real-world scene and computer-generated content (e.g., constructed for an augmented reality application).

As used herein, phrases such as "determine an intersection point," "find an intersection point," and "check for an intersection point" indicate operations performed to identify an intersection point, if any. Such phrases do not imply the identification or existence of a valid intersection point—the operations may fail to find a valid intersection point between a ray and plane/triangle. Similarly, as used herein, phrases such as "represent an intersection point" indicate parameters that describe an intersection point, if any. Such phrases do not imply the existence of a valid intersection point—a parameter for an intersection point may have a default or assigned value that designates the intersection point to be invalid or not yet identified.

As used herein, the term "distance" as applied to a ray equation or measure of separation between positions in a coordinate system can indicate a spatial displacement or temporal displacement (time).

Although operations described herein are in places described as being performed by a GPU architecture for a gaming console, head-mounted display, or graphics card of a desktop computer system, in many cases the operations can be performed by another type of architecture (e.g., a multi-core CPU architecture) and/or other type of computer system (e.g., smartphone, tablet computer). More generally, various alternatives to the examples described herein are possible. For example, certain techniques described with reference to flowchart diagrams can be altered by changing the ordering of stages shown in the flowcharts, by splitting, repeating or omitting certain stages, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computer Systems

FIG. 1 illustrates a generalized example of a suitable computer system (100) in which several of the described innovations may be implemented. The innovations described herein relate to ray tracing, which in general involves tracing rays from a viewing point as the rays pass through an image and continue into a computer-represented environment. The ray tracing can involve light ray tracing operations in a 3D computer graphics environment. Or, the ray tracing can be part of another type of application, such as tracing of rays for detection of collisions of particles, objects, etc. in a physics simulation environment, tracing of rays to model acoustic phenomena in a sound environment, tracing of rays as part of visibility checking in a model of a real-world scene, or tracing of rays in another computer-represented environment. Aside from its use in ray tracing, the computer system (100) is not intended to suggest any limitation as to scope of use or functionality, as the innovations may be implemented in diverse computer systems, including special-purpose computer systems adapted for graphics processing or modeling of complex environments.

With reference to FIG. 1, the computer system (100) includes processing units (110 . . . 11*x*) and local memory (118) of a central processing unit ("CPU"). The processing units (110 . . . 11*x*) are, for example, processing cores on a single chip, and execute computer-executable instructions. The number of processing units (110 . . . 11*x*) of the CPU depends on implementation and can be, for example, 4 or 8. The local memory (118) may be volatile memory (e.g., registers, cache, RAM), non-volatile memory (e.g., ROM, EEPROM, flash memory, etc.), or some combination of the two, accessible by the respective processing unit(s) (110 . . . 11*x*).

The computer system (100) also includes processing units (130 . . . 13*x*) and local memory (138) of a GPU. The number of processing units (130 . . . 13*x*) of the GPU depends on implementation. The processing units (130 . . . 13*x*) are, for example, single-instruction, multiple data ("SIMD") units of the GPU. A shader unit or other processing block of the GPU can include one or more SIMD units. The SIMD width n, which depends on implementation, indicates the number of elements (sometimes called lanes) of a SIMD unit. For example, the number of elements (lanes) of a SIMD unit can be 16, 32, 64, or 128 for an extra-wide SIMD architecture. Each element of the SIMD unit can be considered a separate thread of the SIMD unit. A group of n threads for a SIMD unit can also be called a wave or warp. Threads of a given SIMD unit execute the same code in lockstep on (potentially) different data. In some GPU architectures, a SIMD unit can have an extra lane for data that is the same across all threads of the SIMD unit, which results in a group of n threads plus one scalar thread for that SIMD unit (the scalar thread does not execute code like the n threads of the SIMD unit). The local memory (138) may be volatile memory (e.g., registers, cache, RAM), non-volatile memory (e.g., ROM, EEPROM, flash memory, etc.), or some combination of the two, accessible by the respective processing unit(s) (130 . . . 13*x*). The local memory (138) stores software (180) implementing one or more innovations for ray-triangle intersection testing with tetrahedral planes, for operations performed by threads executing on the respective processing units (130 . . . 13*x*), in the form of computer-executable instructions. In some example implementations, the threads of one of the processing units (130 . . . 13*x*) can execute the computer-executable instructions in lockstep for a group of rays.

The computer system (100) includes shared memory (120), which may be volatile memory (e.g., registers, cache, RAM), non-volatile memory (e.g., ROM, EEPROM, flash memory, etc.), or some combination of the two, accessible by the processing unit(s) (110 . . . 11*x*) of the CPU and the processing units (130 . . . 13x) of the GPU. The memory (120) stores software (180) implementing one or more innovations for ray-triangle intersection testing with tetrahedral planes, at least for high-level control of operations performed by threads of the processing units (130 . . . 13x), in the form of computer-executable instructions. In the GPU, a thread (also called an execution thread or thread of execution), in general, executes a sequence of computer-executable instructions and may have data (e.g., defining a state) associated with it in local memory (138) and/or shared memory (120). Threads also execute on processing units (110 . . . 11x) of the CPU, where such a thread, in general, includes a sequence of computer-executable instructions and may have data (e.g., defining a state) associated with it in local memory (118) and/or shared memory (120).

Alternatively, a processing unit can be a processor in an application-specific integrated circuit ("ASIC") or any other type of processor. The processing unit(s) (110 . . . 11x, 130 . . . 13x) can be part of a system-on-a-chip ("SoC").

The computer system (100) includes one or more network interface devices (140). The network interface device(s) (140) enable communication over a network to another computing entity (e.g., server, other computer system). The network interface device(s) (140) can support wired connections and/or wireless connections, for a wide-area network, local-area network, personal-area network or other network. For example, the network interface device(s) can include one or more Wi-Fi transceivers, an Ethernet port, a cellular transceiver and/or another type of network interface device, along with associated drivers, software, etc. The network interface device(s) (140) convey information such as computer-executable instructions, audio or video input or output, or other data in a modulated data signal over network connection(s). A modulated data signal is a signal that has one or more of its characteristics set or changed in such a manner as to encode information in the signal. By way of example, and not limitation, the network connections can use an electrical, optical, RF, or other carrier.

A camera input (150) accepts video input in analog or digital form from a video camera, which captures natural video. An audio input accepts audio input in analog or digital form from a microphone (150), which captures audio.

The computer system (100) optionally includes a motion sensor/tracker input (152) for a motion sensor/tracker, which can track the movements of a user and objects around the user. For example, the motion sensor/tracker allows a user (e.g., player of a game) to interact with the computer system (100) through a natural user interface using gestures and spoken commands. The motion sensor/tracker can incorporate gesture recognition, facial recognition and/or voice recognition.

A game controller input (154) accepts control signals from one or more game controllers, over a wired connection or wireless connection. The control signals can indicate user inputs from one or more directional pads, buttons, triggers and/or one or more joysticks of a game controller. The control signals can also indicate user inputs from a touchpad or touchscreen, gyroscope, accelerometer, angular rate sensor, magnetometer and/or other control or meter of a game controller.

The computer system (100) optionally includes a media player (156) and video input (158). The media player (156) can play DVDs, Blu-ray disks, other disk media and/or other formats of media. The video input (158) can accept input video in analog or digital form (e.g., from a cable input, HDMI input or other input).

A video output (160) provides video output to a display device. The video output (160) can be an HDMI output or other type of output. An audio output (160) provides audio output to one or more speakers.

The storage (170) may be removable or non-removable, and includes magnetic media (such as magnetic disks, magnetic tapes or cassettes), optical disk media and/or any other media which can be used to store information and which can be accessed within the computer system (100). The storage (170) stores instructions for the software (180) implementing one or more innovations for ray-triangle intersection testing with tetrahedral planes.

The computer system (100) may have additional features. For example, the computer system (100) includes one or more other input devices and/or one or more other output devices. The other input device(s) may be a touch input device such as a keyboard, mouse, pen, or trackball, a scanning device, or another device that provides input to the computer system (100). The other output device(s) may be a printer, CD-writer, or another device that provides output from the computer system (100).

An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The innovations can be described in the general context of computer-readable media. Computer-readable media are any available tangible media that can be accessed within a computing environment. By way of example, and not limitation, with the computer system (100), computer-readable media include memory (118, 120, 138), storage (170), and combinations thereof. The term computer-readable media does not encompass transitory propagating signals or carrier waves.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system. Some code listings shown herein include instructions in High Level Shader Language ("HLSL"). The HLSL code in the code listings can be compiled to run in threads of a processing unit (e.g., a SIMD unit of a GPU). Alternatively, approaches shown herein can be implemented in another programming language.

The terms "system" and "device" are used interchangeably herein. Unless the context clearly indicates otherwise, neither term implies any limitation on a type of computer system or device. In general, a computer system or device can be local or distributed, and can include any combination of special-purpose hardware and/or hardware with software implementing the functionality described herein.

For the sake of presentation, the detailed description uses terms like "determine," "receive" and "provide" to describe computer operations in a computing system. These terms denote operations performed by a computer and should not be confused with acts performed by a human being. The actual computer operations corresponding to these terms vary depending on implementation.

II. Examples of Ray Tracing and Bounding Volume Hierarchies

Figure 2:
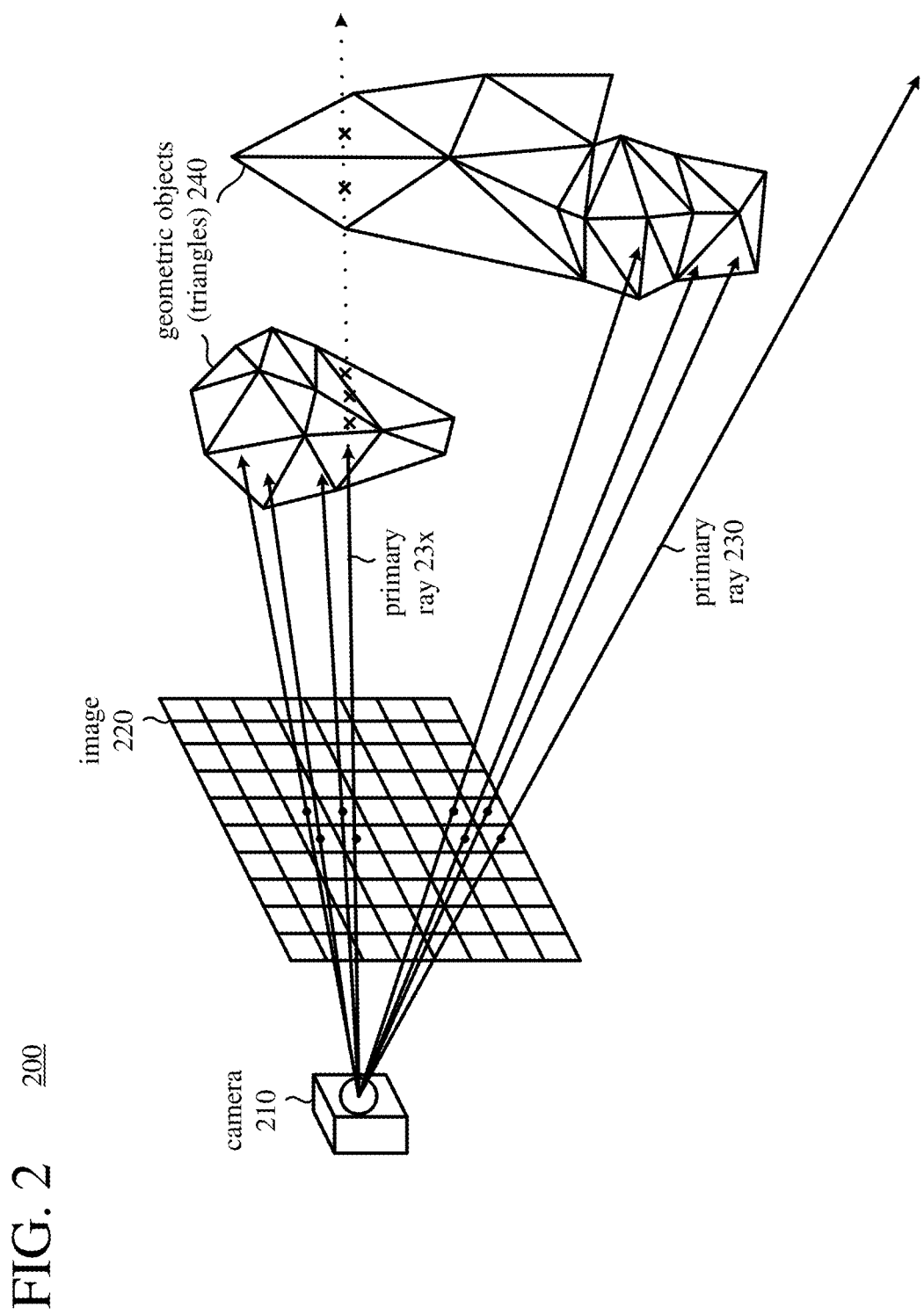
FIG. 2 is a diagram illustrating an example of ray tracing in a 3D computer graphics environment.

FIG. 2 shows an example (200) of ray tracing in a 3D computer graphics environment. The ray tracing generates an image (220) from the perspective of a virtual camera (210), which represents a viewing point. Rays (230 . . . 23x) from the camera (210) pass through pixels of the image (220) into the environment. The environment includes geometric objects (240), which are triangles in FIG. 2. The triangles are fitted to the surfaces of more complex shapes in the environment. For the sake of illustration, FIG. 2 shows a very small image (220) and a handful of geometric objects (240). In practice, an image may include hundreds of thousands or even millions of pixels, and the environment may include hundreds of thousands or even millions of geometric objects (240).

The rays (230 . . . 23x) from the virtual camera (210) (also called view rays or camera rays) are an example of primary rays. For a given pixel of the image (220), the path of the primary ray (230 . . . 23x) that passes through the pixel is traced until it intersects with one of the geometric objects (240) in the environment. In FIG. 2, each of the rays (230 . . . 23x) ends at an intersection point if it intersects one of the geometric objects (240). In FIG. 2, one of the primary rays (230) does not intersect any of the geometric objects (240). A given ray can potentially intersect multiple geometric objects (240), as shown for one of the rays (23x) with multiple intersections marked with x's. In this case, the intersection closest to the virtual camera (210) is counted as the intersection of the primary ray (23x).

Each of the geometric objects (240) has vertices and/or edges that define its shape and position in the environment. In addition, the surface of each of the geometric objects (240) can have a color associated with it, as well as values that indicate albedo (reflectivity), scattering, refraction, diffusion or another material property (or, vertices of the geometric object (240) can have associated colors and material properties, for use in interpolation for intersection points within the geometric object (240)). At an intersection point, depending on the surface of the geometric object (240) at the intersection point, a ray (230 . . . 23x) can be reflected or refracted within the environment, or it can generate diffuse rays, to simulate optical effects such as reflection, refraction/translucence, scattering, and dispersion. Also, for each light source, a shadow ray can be generated from the intersection point, in the direction of the light source, to simulate optical effects such as shading from the light source (that is, blocking of light from the light source).

Reflected rays, refracted rays, diffuse rays, and shadow rays that stem from the intersection point of a primary ray (230 . . . 23x) are examples of secondary rays. Such secondary rays are similarly traced in the environment, and can generate other rays (tertiary rays), and so on. Successive rays can be generated, for example, until a threshold number of stages is reached or threshold distance is traveled. Ultimately, for a given pixel of the image (220), the value of the given pixel depends on the color of the surface of the object (240) at the intersection point as well as results reported back from secondary rays, which may in turn depend on results reported back from tertiary rays, and so on. In this way, the ray tracing can simulate shadows, reflected light, refracted light, and other effects at the intersection point for the primary ray (230 . . . 23x). Thus, in addition to the color of the surface at the intersected point for the primary ray (230 . . . 23x), the value of a given pixel of the image (220) can depend on the incoming light and material properties of the object at the intersection point for the primary ray (230 . . . 23x).

Although geometric objects (240) such as triangles provide a convenient way to represent complex objects in the environment, the resulting representation can include a very large number of geometric objects (240). To organize the geometric objects (240) and simplify the process of finding intersection points for rays, the geometric objects (240) can be enclosed in successively larger groups, which are represented in a bounding volume hierarchy ("BVH").

Figure 3:
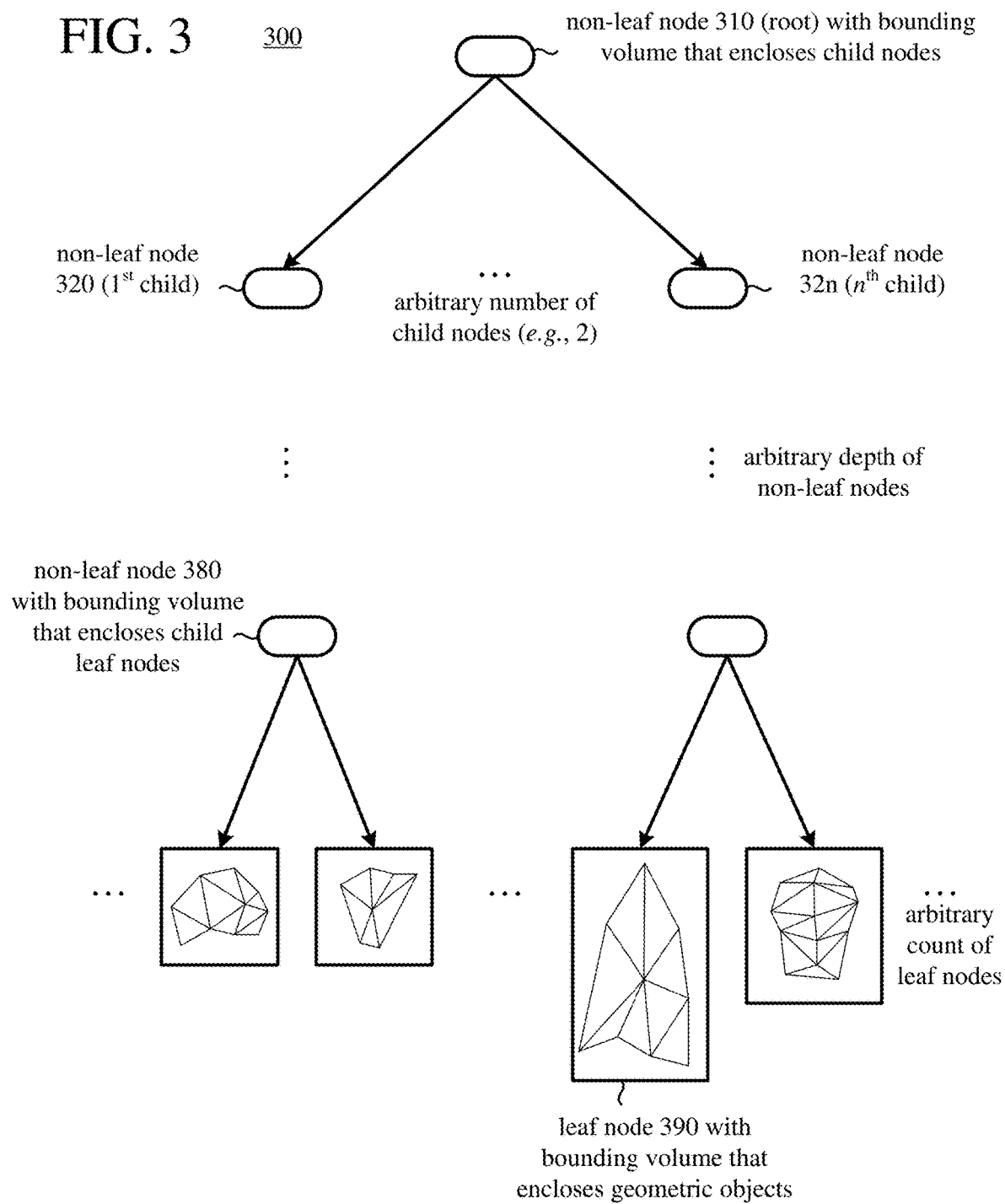
FIG. 3 is diagram illustrating an example of BVH for geometric objects in the environment of FIG. 2.

FIG. 3 shows an example (300) of BVH for geometric objects in the environment of FIG. 2. The BVH (300) is structured as a tree. For a leaf node (390) of the BVH (300), a subset of the geometric objects (240) in the environment is wrapped in a bounding volume. The bounding volume is typically a sphere (that is, a parametric sphere) or box (that is, a rectangular prism or cubic volume). For example, the bounding volume is an axis-aligned bounding box. In the BVH (300) of FIG. 3, the bounding volumes are bounding boxes. Collectively, bounding volumes for leaf nodes of the BVH (300) enclose all of the geometric objects (240) of the environment.

The leaf nodes are grouped in small sets, which typically correspond to adjoining regions of the environment. A non-leaf node (380), which can also be called an interior node, has a bounding volume that encloses a small set of leaf nodes, which are the child leaf nodes of the non-leaf node (380). At the level of the BVH (300) above the leaf nodes, non-leaf nodes have bounding volumes that, collectively, enclose all of the leaf nodes. In a recursive manner, sets of non-leaf nodes at a given level are, in turn, enclosed within successively larger bounding volumes through an arbitrary depth of non-leaf nodes. Eventually, a root node (310) of the BVH (300) encloses all of the non-leaf nodes and leaf nodes of the BVH (300).

As shown in FIG. 3, a non-leaf node (310, 380) has a bounding volume that encloses child nodes of the non-leaf node. In FIG. 3, the root node (310) has non-leaf nodes (320 . . . 32n) for a $1^{st}$ child through $n^{th}$ child. In general, each non-leaf node (310, 380) has an arbitrary number of child nodes (e.g., 2, 4, 8). Typically, each non-leaf node of the BVH (300) has the same number of child leaf nodes. Thus, the BVH (300) can be organized as a binary tree (with each non-leaf node having two child nodes), as a quad tree (with each non-leaf node having four child nodes), as an oct tree (with each non-leaf node having eight child nodes), or in some other way.

III. Example Approaches to Parallel BVH Traversal

To test for intersections of a ray with geometric objects (such as triangles) in a computer-represented environment, the ray can be tested against a BVH that encloses the geometric objects. If there is an intersection between the ray and the bounding volume for the root node of the BVH, the ray can be tested against the bounding volumes for the respective child nodes of the root node, and so on. In this way, the ray can be tested against successively smaller, enclosed bounding volumes of the BVH. When there is an intersection between the ray and the bounding volume of a leaf node of the BVH, the ray can be tested for intersections with the geometric objects (e.g., triangles) enclosed by the bounding volume of the leaf node. At any stage, if a ray does not intersect a given bounding volume, further tests against bounding volumes (and geometric objects) within the given bounding volume can be skipped. In other words, bounding volumes for child nodes of a BVH need not be evaluated if the bounding volume for their parent node is not intersected. Similarly, geometric objects in a leaf node of the BVH need not be evaluated if the bounding volume for the leaf node is not intersected.

For a GPU architecture, BVH traversal can be performed in parallel for a group of n rays, using n threads of a processing unit. (More specifically, the processing can be performed using n threads of a processing unit such as a SIMD unit.) A GPU architecture typically includes multiple processing units (e.g., SIMD units of a GPU). A shader unit or other processing block of the GPU can include one or more SIMD units. The SIMD width n, which depends on implementation, indicates the number of elements (sometimes called lanes) of a SIMD unit. For example, the SIMD width n can be a value $2^s$, where s is an integer greater than 0, for 2, 4, 8, 16, 32, 64, or 128 elements of a SIMD unit). Each element of the SIMD unit can be considered a separate thread of the SIMD unit. A group of n threads for a SIMD unit can also be called a wave or warp. The n threads of a SIMD unit execute the same code in lockstep on (potentially) different data for the n threads. For parallel BVH traversal for a group of n rays, each of the n threads runs the same set of instructions. For example, the n threads can all execute code for BVH traversal operations in parallel for the n rays. Or, the n threads can all execute code for leaf processing operations in parallel for the n rays (e.g., intersection tests for triangles).

This section describes examples of parallel BVH traversal operations. In general, n threads execute code to evaluate a group of n rays in parallel. Each of the n threads traces a single ray in the group of n rays. The n rays have different ray directions and can potentially intersect different geometric objects. Intersection points (distances, coordinates, etc.) will typically be different even if the n rays intersect the same geometric object.

Figure 4:
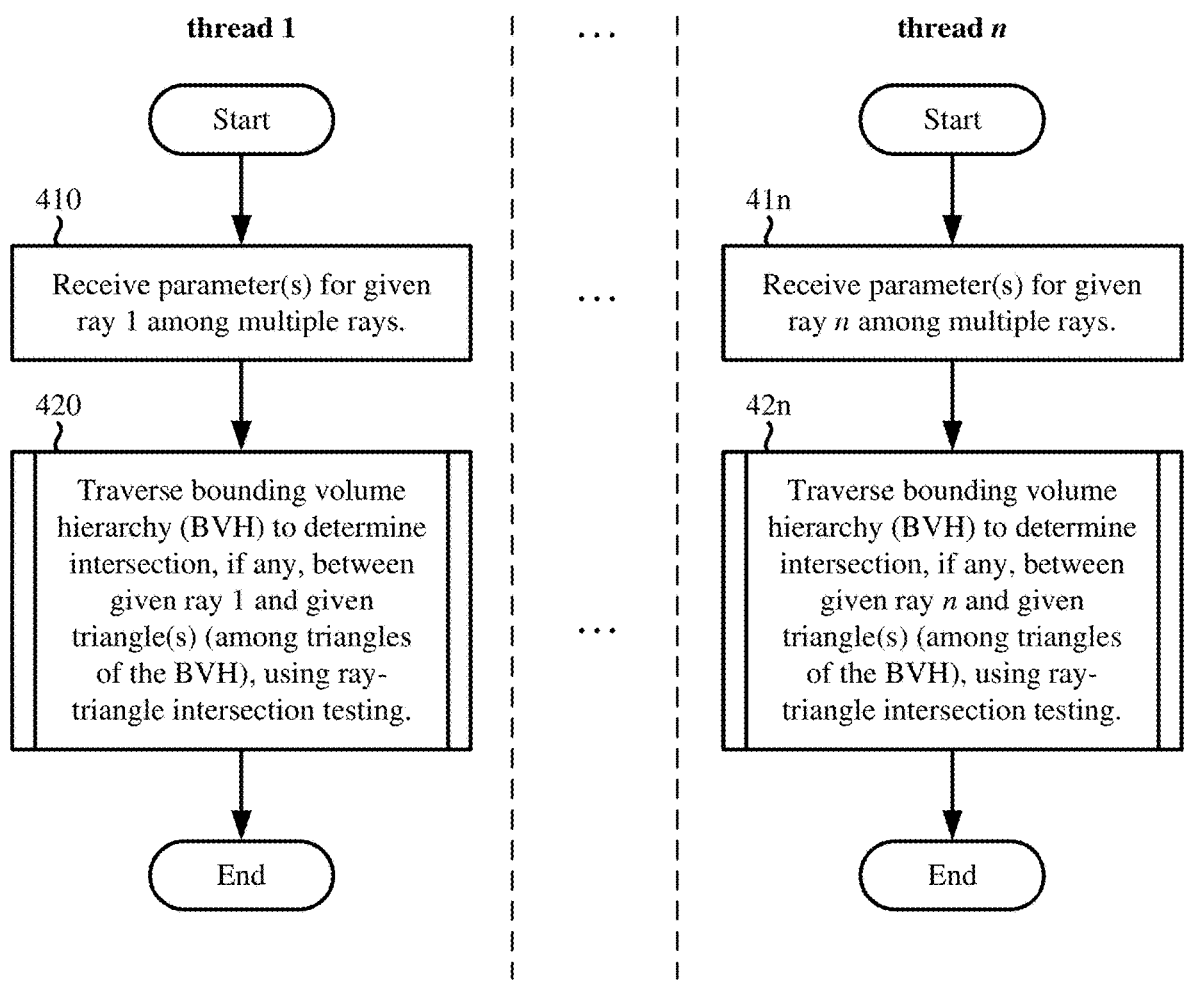
FIG. 4 is a flowchart illustrating a generalized technique for parallel traversal of a BVH during ray tracing.

FIG. 4 shows a generalized technique (400) for parallel traversal of a BVH during ray tracing. The technique (400) can be performed, for example, by processing units of a computer system that implements a graphics tool or other ray tracing tool. The computer system can include a processing unit with multiple threads in a group (such as a wave or warp), which perform ray tracing for multiple rays of a group in parallel in a computer-represented environment. For example, in some example implementations, the multiple processing units are shader units or other processing blocks of a GPU, and the multiple threads are elements (lanes) of one of the SIMD units. Alternatively, the multiple processing units can be processor cores of one or more CPUs.

The computer-represented environment includes multiple triangles enclosed in a BVH. Alternatively, the BVH encloses another type of geometric objects. The BVH has multiple leaf nodes and one or more non-leaf nodes. Each of the leaf nodes includes one or more of the triangles enclosed in the BVH. More specifically, each of the leaf nodes represents a bounding volume around the triangle(s) of that leaf node. Each of the non-leaf node(s) represents a bounding volume around one or more of the leaf nodes or other non-leaf nodes (at a layer of the BVH closer to the leaf nodes).

FIG. 4 shows the behavior of multiple threads executing code in parallel, including thread 1 to thread n. The same set of instructions (e.g., for BVH traversal, for leaf processing) is executable on each of the threads. The n threads, collectively, determine intersections, in any, for a group of n rays as the multiple rays. For example, n is a value $2^s$, where s is an integer greater than 0. Thus defined, n can be 2, 4, 8, 16, 32, 64, 128, or some other value. Each of the threads performs operations for a different one of the n rays.

Each of the threads receives (410, 41n) one or more parameters for a given ray among the multiple rays. For example, the parameter(s) for a given ray include an origin of the given ray, a direction of the given ray, and a distance to a leading intersection for the given ray, which is the closest intersection point (closest to the ray origin) found so far for the given ray. (Initially, the distance to the closest intersection so far can have a value that indicates no intersection point, e.g., a highest possible value.) Alternatively, the parameter(s) for the given ray include other and/or additional parameters.

Each of the n threads traverses (420, 42n) the BVH to determine an intersection point between its given ray and a given triangle among the triangles of the BVH. The order of traversal of the BVH can be synchronized between the n threads for the respective rays. For example, if any of the n rays intersects the bounding box at a location better (closer) than the leading intersection found so far for that ray, then all n threads continue the BVH traversal process within the node. When checking for an intersection point between the given ray and a given triangle, in some example implementations, the thread can use ray-triangle intersection testing with tetrahedral planes, as described herein, or another form of ray-triangle intersection testing.

Figure 5:
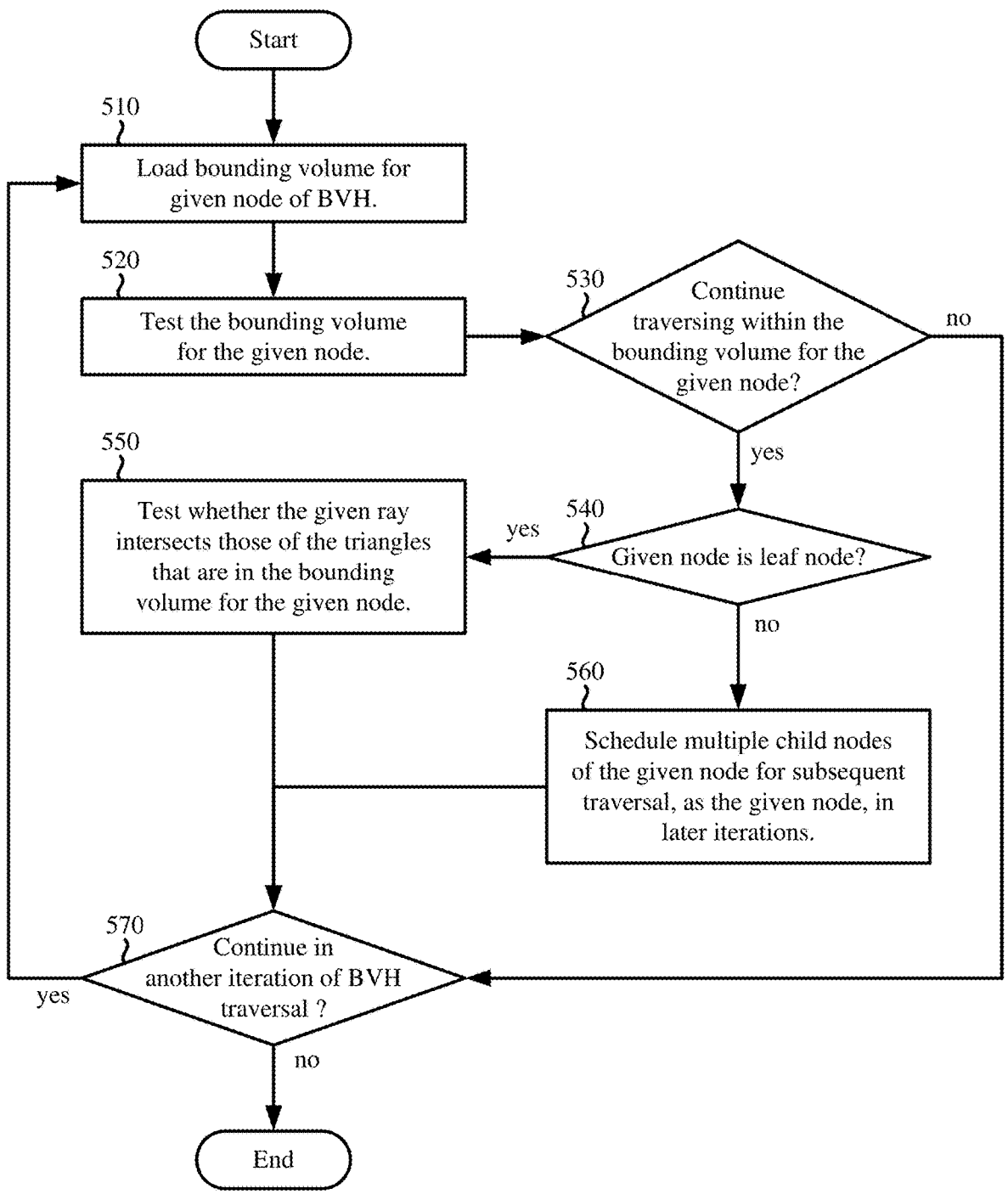
FIG. 5 is a flowchart of an example technique for the traversal stage of the generalized technique.

FIG. 5 shows an example technique (500) for the traversal stage (420, 42n) of the generalized technique (400). For the technique (500), each of the n threads performs, for a different ray, operations in multiple iterations.

The thread loads (510) a bounding volume for a given node of the BVH. For example, the bounding volume is a bounding box. Alternatively, the bounding volume has another shape (e.g., sphere). For the first iteration, the given node can be the root node of the BVH.

For the given ray, the thread tests (520) the bounding volume for the given node. For example, the thread checks whether the bounding volume for the given node may include any new intersection closer than the closest intersection found so far for the given ray for the thread. Then, the thread determines (530) whether to continue the traversing within the bounding volume for the given node. If the thread determines to continue the traversing within the bounding volume for the given node, the thread determines (540) whether the given node is a leaf node. This can be determined, for example, by checking a flag for the given node.

If the given node is a leaf node, in a leaf processing stage, the thread tests (550) whether its given ray intersects those of the multiple triangles that are in the bounding volume for the given node. Sections below describe examples of ray-triangle intersection testing for leaf processing operations. Alternatively, the leaf processing operations are performed in another way.

Otherwise (the given node is not a leaf node), the thread schedules (560) multiple child nodes of the given node for subsequent traversal, as the given node, in later ones of the multiple iterations. For example, the thread pushes node indices for left and right child nodes of the given node on a stack.

The thread checks (570) whether to continue in another iteration of BVH traversal. If so, the thread loads (510) the bounding volume for the next (scheduled) node in the BVH traversal. In general, the traversing follows a selective depth-first traversal pattern. The BVH traversal completes when all nodes have been evaluated or skipped as part of pruned branches of the BVH.

After the traversing completes for a given ray, one or more parameters represent the intersection point between the given ray and an intersected triangle of the BVH. For example, the parameter(s) that represent the intersection point include an identifier ("ID") of the intersected triangle, barycentric weights for the intersection point inside the intersected triangle, and a distance to the intersection point. Alternatively, the parameter(s) that represent the intersection point include other and/or additional parameters.

IV. Example Approaches to Ray-Triangle Intersection Tests Using Plane Data

This section describes various examples of ray-triangle intersection tests that use plane data representing triangles. Compared to using vertex data and edge data to represent triangles, using plane data can consume more storage (unless plane data is shared between faces of a tetrahedral cluster), but also can make ray-triangle intersection testing operations more computationally efficient.

Figure 6:
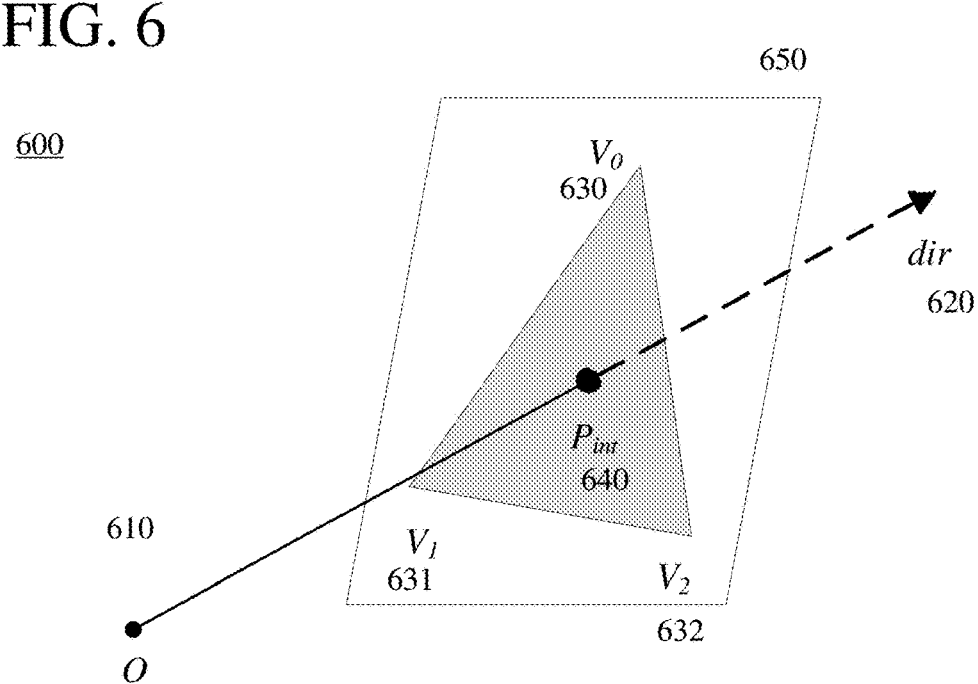
FIG. 6 is a diagram geometrically illustrating the intersection of a ray with a triangle.

FIG. 6 shows an example (600) of a ray with an origin at O (610) and direction dir (620). In FIG. 6, the ray intersects a triangle defined by its vertices (630, 631, 632), which are labeled $V_0$, $V_1$, and $V_2$ in FIG. 6, at intersection point $P_{int}$ (640). The quadrilateral region (650) diagrammatically surrounding triangle [$V_0$, $V_1$, $V_2$] represents the supporting plane of the triangle, i.e., the plane that the triangle lies on.

Ray-triangle intersection testing often occurs in the context of ray tracing, where multiple rays traverse a BVH or other acceleration structure and are tested against multiple triangles during the traversal step. For a given ray, the goal is to search the multiple triangles and find the closest intersection point in one of the multiple triangles. The origin O and direction dir of the given ray are known. In general, for the given ray and a triangle [$V_0$, $V_1$, $V_2$], the ray-triangle intersection test includes two steps. First, the point of intersection $P_{int}$ is determined by finding an intersection point in 3D space for the given ray and the plane that includes the triangle [$V_0$, $V_1$, $V_2$]. The ray-plane intersection step can be performed by finding the distance t along the ray in direction dir from the ray origin O to the intersection point in the plane. That is, $P_{int}$=O+t*dir, where * indicates a multiplication by a scalar value. Second, the intersection point $P_{int}$ is tested to determine whether it is inside or outside the triangle [$V_0$, $V_1$, $V_2$]. To determine whether the intersection point $P_{int}$ is inside the triangle [$V_0$, $V_1$, $V_2$], barycentric weights are computed for the intersection point $P_{int}$.

Barycentric weights, also referred to as barycentric coordinates, allow a point to be defined by its relationship to the vertices. A point P with barycentric weights [$w_0$, $w_1$, $w_2$] relative to the triangle [$V_0$, $V_1$, $V_2$] is determined by this formula:

$$P = w_0 * V_0 + w_1 * V_1 + w_2 * V_2, \text{ where}$$

$$w_0 + w_1 + w_2 = 1.$$

An alternative formulation is:

$$P = (1 - w_1 - w_2) * V_0 + w_1 * V_1 + w_2 * V_2, \text{ or}$$

$$P = V_0 + w_1 * (V_1 - V_0) + w_2 * (V_2 - V_0).$$

A barycentric weight relative to a given vertex of a triangle can be computed for a point P by computing (a) the distance from the point P to the opposing edge (not including the given vertex), divided by (b) the distance to the given vertex from the opposing edge. This yields a barycentric weight of 1 for a position of the point P on the given vertex, a barycentric weight of 0 for a position of the point P on the opposing edge, or a barycentric weight somewhere between 0 and 1 for a position of the point P inside the triangle (higher as the point P gets further from the opposing edge and closer to the given vertex). If the barycentric weight is less than 0 or greater than 1, the point P is outside the triangle. All three barycentric weights can be computed in this fashion, though in practice only two weights are often computed because the third is implied by constraint $w_0 + w_1 + w_2 = 1$.

With reference to the example in FIG. 6, since $P_{int}$=O+t*dir, in terms of barycentric weights, the intersection point $P_{int}$ of a given ray with the triangle's plane can be presented as O+t*dir=$V_0 + w_1 * (V_1 - V_0) + w_2 * (V_2 - V_0)$. In this equation, the values O, dir, $V_0$, $V_1$, and $V_2$ are known, and the values t, $w_1$, and $w_2$ are unknown. In order to find the barycentric weights $w_1$ and $w_2$ for the intersection point $P_{int}$, the distance t along the ray is calculated. The plane that includes the triangle [$V_0$, $V_1$, $V_2$] can be represented, in part, using the normal N. The normal N=$(V_1 - V_0) \times (V_2 - V_1)$, where × indicates a cross product operation between two vectors. Given the normal N and a triangle vertex $V_0$, the distance t=−(O−$V_0$)·N| (dir·N), where · indicates a dot product operation between two vectors.

Ray-triangle intersection testing detects and handles various special cases for the configuration of a ray and triangle. For example, one special case is when the ray and the plane that includes the triangle are parallel, such that the ray and triangle cannot possibly intersect. This special case can be identified using the dot product of the plane's normal N and the direction dir of the ray, which is already calculated when finding the distance t. When the plane that includes the triangle is parallel to the ray, the plane's normal N and the ray's direction dir are perpendicular, such that the dot product (dir·N) is zero. Detecting if (din·N) is zero also avoids a divide-by-zero problem when finding the distance t. In practice, the special case may be found to occur if (dir·N) is closer to zero than a threshold distance, which depends on implementation. That is, the special case occurs if the ray and plane are at least substantially parallel: (dir·N) is within the threshold distance from zero.

Another special case is when the triangle is behind the ray origin O (opposite to the ray direction dir). For this special case, even though an actual value for distance t may be found, the sign of t is checked before an intersection point is deemed to be valid. If the distance t is smaller than 0, the intersection point between the ray and plane that includes the triangle would behind the ray's origin O, in the opposite direction. On the other hand, if the distance t is greater than 0, the triangle is visible to the ray and an intersection point inside the triangle is possible.

After a valid intersection point with the plane is computed as $P_{int}$=O+t·dir, barycentric weights can be computed to assess whether the intersection point $P_{int}$ is inside the triangle [$V_0$, $V_1$, $V_2$]. The intersection point $P_{int}$ is deemed to be inside the triangle if it falls on a vertex $V_0$, $V_1$, or $V_2$, falls on an edge $V_0V_1$, $V_1V_2$, or $V_2V_0$, or falls in the interior of the triangle [$V_0$, $V_1$, $V_2$]. The barycentric weights of $P_{int}$ can be computed by solving P=$w_0 * V_0 + w_1 * V_1 + w_2 * V_2$. Once the barycentric weights $w_0$, $w_1$, and $w_2$ are known, it can be determined whether $P_{int}$ is inside the triangle by checking whether the conditions $w_1 \geq 0$, $w_2 \geq 0$, and $(w_1 + w_2) \leq 1$ are fulfilled.

The barycentric weights can be found by, for example, applying the Möller-Trumbore intersection algorithm, which is described in Möller et al, "Fast, Minimum Storage Ray/Triangle Intersection," *Journal of Graphics Tools*, vol. 2, no. 1, pp. 21-28 (1997). The Möller-Trumbore intersection algorithm is considered a fast algorithm for ray-triangle intersection testing, and it is often used in benchmarks to compare performances of other approaches. The Möller-Trumbore intersection algorithm takes advantage of the parameterization of the intersection point $P_{int}$ in terms of barycentric weights, and it utilizes Cramer's rule to calculate $w_0$, $w_1$, and $w_2$ in a fast way. The Möller-Trumbore intersection algorithm operates directly on vertex data and edge data for a triangle. Typically, three vertices (represented using 9 floats) are used to represent a triangle and used for calculation, which is a compact representation in terms of memory usage. Operations of the Möller-Trumbore intersection algorithm, however, are computationally expensive. In part, the computational cost is attributable to cross product operations.

Other ray-triangle intersection algorithms use plane data for planes that include a triangle and some of its edges for ray-triangle intersection testing. For example, the Havel-Herout intersection algorithm is described in Havel et al., "Yet Faster Ray-Triangle Intersection (Using SSE4)," *IEEE Transactions on Visualization and Computer Graphics* (2009). According to the Havel-Herout intersection algorithm, besides a plane which includes the original (face) triangle, two more bounding planes that are perpendicular to the original triangle are constructed. Each of the two bounding planes includes an edge of the original (face) triangle $[V_0, V_1, V_2]$. The barycentric weights of an intersection point can be calculated using the three pre-computed planes. The first (face) plane includes the original triangle $[V_0, V_1, V_2]$ and is represented by a normal vector $N_F=(V_1-V_0)\times(V_2-V_0)$ and distance d from the world origin of the coordinate system to the first plane. The second (bounding) plane through the edge $V_0V_2$ is represented by a normal vector $N_1=(V_2-V_0)\times N_F/|N_F|^2$ and distance $d_1$ from the world origin to the second plane. The third (bounding) plane through edge $V_0V_1$ is represented by a normal vector $N_2=(V_1-V_0)\times N_F/|N_F|^2$ and distance $d_2$ from the world origin to the third plane. The Havel-Herout intersection algorithm can store plane data for the three planes as 12 floats (four floating-point values per plane), which consumes more memory per triangle than the Möller-Trumbore intersection algorithm. The Havel-Herout intersection algorithm is computationally more efficient, however—pre-processing of vertex data into plane data eliminates cross product operations in the ray-triangle intersection testing itself.

In another variation, the barycentric weights of an intersection point can be calculated using three pre-computed planes that include a shared vertex instead of three different distance values. The first (face) plane includes the original triangle and is represented by a normal vector $N_F=(V_1-V_0)\times(V_2-V_0)$ and a vertex $V_0$. The second (bounding) plane through edge $V_0V_2$ is represented by a normal vector $N_1=(V_2-V_0)\times N_F/|N_F|^2$ and the same vertex $V_0$. The third (bounding) plane through edge $V_0V_1$ includes a normal vector $N_2=(V_1-V_0)\times N_F/|N_F|^2$ and the same vertex $V_0$. In this variation, plane data for a triangle can be stored as 12 floats (three floating-point values for each of the normal vectors, and three floating-point values for the shared vertex), which is comparable to the Havel-Herout intersection algorithm. Compared to the Havel-Herout intersection algorithm, however, precision is better for ray-triangle intersection test operations.

Figure 7:
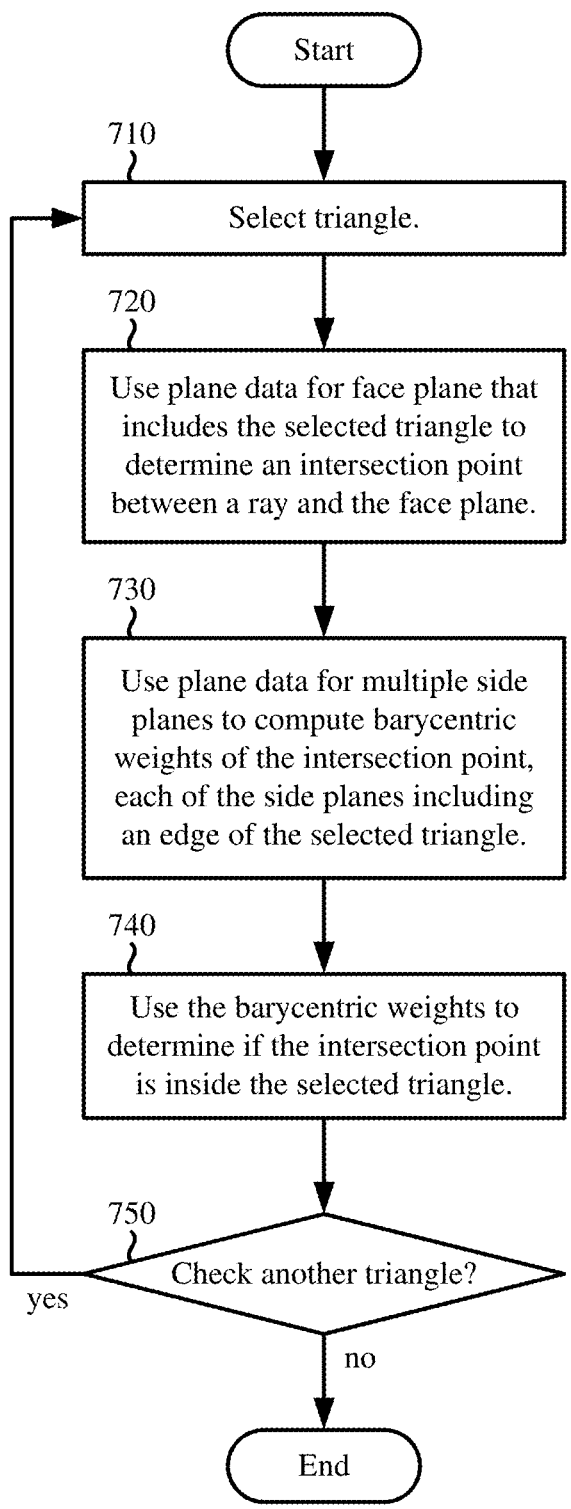
FIG. 7 is a flowchart illustrating a generalized technique for performing a ray-triangle intersection test using pre-computed plane data.

FIG. 7 shows a generalized technique (700) for performing a ray-triangle intersection test during ray tracing using pre-computed plane data. The technique (700) can be performed, for example, by processing units of a computer system that implements a graphics tool or other ray tracing tool. The computer system can include a processing unit with multiple threads in a group (such as a wave or warp), which perform ray tracing for multiple rays of a group in parallel in a computer-represented environment, which includes multiple triangles. Thus, the technique (700) can be performed for different rays in parallel with different threads of a given processing unit of the multiple processing units. FIGS. 8a and 8b are HLSL code listings (801, 802) for example implementations of ray-triangle intersection testing with pre-computed plane data.

With reference to FIG. 7, the ray tracing tool selects (710) a triangle, which has pre-computed plane data associated with it. The plane data includes parameters of a face plane that includes the selected triangle. The plane data also includes parameters of multiple side planes. Each of the multiple side planes includes an edge of the selected triangle. In some example implementations, the face plane and multiple side planes include faces of a tetrahedral cluster. Alternatively, the face plane and multiple side planes do not define a tetrahedral cluster (e.g., because the side planes are perpendicular to the face plane).

The ray tracing tool uses (720) the plane data for the face plane, which includes the selected triangle, to determine an intersection point between a ray and the face plane. The ray tracing tool uses (730) the plane data for multiple side planes to compute barycentric weights of the intersection point, and then uses (740) the barycentric weights to determine if the intersection point is inside the selected triangle.

In some example implementations, the plane data for the face plane and the side planes includes, for each plane, a normal of the plane and a distance from a world origin to the plane. The ray tracing tool can use such plane data to determine an intersection point and compute barycentric weights, for example, as shown in the code listing (801) of FIG. 8a.

With reference to FIG. 8a, the function TestRayTriangleIntersection( ) accepts input parameters that specify the origin of a ray (RayOrigin), the direction of the ray (RayDirection), the face plane (FacePlane), and two side planes (SidePlane0, SidePlane1). The function produces an output parameter (bary) that specifies barycentric weights for an intersection point between the ray and triangle in the face plane. The function returns a value that indicates a distance T to the intersection point, if the intersection point is valid.

As shown in FIG. 8a, the function TestRayTriangleIntersection( ) uses the plane data for the face plane to determine the intersection point. In particular, the function computes a variable Denom by negating the dot product of the normal vector (FacePlane.xyz) of the face plane and the ray direction (RayDirection). The function checks if the ray is at least substantially parallel to the face plane and also checks if the triangle is back-facing. Specifically, the function compares the variable Denom to a threshold distance (EPSILON) to determine if the triangle is back-facing or if the ray is at least substantially parallel to the face plane. If so, the function returns a distance value FLT_MAX that indicates no valid intersection point has been found.

The function computes the distance from the ray origin (RayOrigin) to the intersection point by adding (1) the distance (FacePlane.w) from the world origin to the face plane to (2) the dot product of (a) the normal of the face plane (FacePlane.xyz) and ray origin (RayOrigin), and dividing the sum by (3) the variable Denom. The function checks if the intersection point is behind the origin of the ray. Specifically, the function checks if the resulting distance is less than a threshold distance (EPSILON, which is very close to zero) and, if so, returns the distance value FLT_MAX to indicate no valid intersection point has been found.

The function computes the intersection point (PointOnPlane) based on the ray origin, the ray direction, and the distance (T) from the ray origin to the intersection point:

PointOnPlane=RayOrigin+RayDirection*T.

The function then uses the plane data for the multiple side planes to compute barycentric weights of the intersection point. The function computes a first barycentric weight (bary.x) by adding (1) the distance (SidePlane0.w) from the world origin to a first side plane, to (2) the dot product of (a) the normal vector (SidePlane1.xyz) of the first side plane and (b) the intersection point (PointOnPlane). The function computes a second barycentric weight (bary.y) based on (1) the distance (SidePlane1.w) from the world origin to a second side plane, and (2) a dot product of (a) the normal vector (SidePlane1.xyz) of the second side plane and (b) the intersection point (PointOnPlane).

Finally, the function checks if the first and second barycentric weights indicate the intersection point (PointOnPlane) is inside the specified triangle. Specifically, the function checks if each of the barycentric weights (bary.x, bary.y) is at least 0.0, and the function checks if the sum of the barycentric weights (bary.x, bary.y) is less than 1.0. If so, the function returns the distance value T. Otherwise, the function returns the distance value FLT_MAX, which indicates no valid intersection point has been found.

In other example implementations, the plane data for the face plane and the side planes includes a vertex shared between the face plane and the side planes and further includes, for each plane, a normal of the plane. The ray tracing tool can use such plane data to determine an intersection point and compute barycentric weights, for example, as shown in the code listing (802) of FIG. 8b.

In FIG. 8b, the function TestRayTriangleIntersection_AlternateFormulation( ) accepts input parameters that specify the origin of a ray (RayOrigin), the direction of the ray (RayDirection), a normal vector (FaceNormal) of the face plane, normal vectors (SideVector0, SideVector1) of two side planes, and a shared vertex (TriangleOrigin). The normal vectors of the planes are essentially the same as the normal vectors in the code listing (801) of FIG. 8a, but the notation is different. Instead of distance values for the respective planes, however, a single shared vertex (TriangleOrigin) is input. The function produces an output parameter (bary) that specifies barycentric weights for an intersection point between the ray and triangle in the face plane. The function returns a value that indicates a distance T to the intersection point, if the intersection point is valid.

As shown in FIG. 8b, the function adjusts the ray origin (RayOrigin) by subtracting the shared vertex (TriangleOrigin). In effect, this adjusts the ray origin to the new local origin.

The function uses the plane data for the face plane to determine the intersection point. In particular, the function computes a variable Denom by negating the dot product of the normal vector (FaceNormal) of the face plane and the ray direction (RayDirection). The function checks if the ray is at least substantially parallel to the face plane and also checks if the triangle is back-facing. Specifically, the function compares the variable Denom to a threshold distance (EPSILON) to determine if the triangle is back-facing or if the ray is at least substantially parallel to the face plane. If so, the function returns a distance value FLT_MAX, which indicates no valid intersection point has been found.

The function computes the distance from the ray origin (RayOrigin) to the intersection point by dividing (1) the dot product of the normal (FaceNormal) of the face plane and ray origin (RayOrigin), by (2) the variable Denom. The function checks if the intersection point is behind the origin of the ray. Specifically, the function checks if the resulting distance is less than the threshold distance (EPSILON) and, if so, returns the distance value FLT_MAX to indicate no valid intersection point has been found.

As in the code listing (801) of FIG. 8a, the function computes the intersection point (PointOnPlane) based on the ray origin, the ray direction, and the distance (T) from the ray origin to the intersection point: PointOnPlane=RayOrigin+RayDirection*T. The function then uses the plane data for the multiple side planes to compute barycentric weights of the intersection point. The function computes a first barycentric weight (bary.x) as the dot product of (a) the normal vector (SideVector0) of the first side plane and (b) the intersection point (PointOnPlane). The function computes a second barycentric weight (bary.y) as the dot product of (a) the normal vector (SideVector1) of the second side plane and (b) the intersection point (PointOnPlane). Finally, as in the code listing (801) of FIG. 8a, the function checks if the first and second barycentric weights indicate the intersection point (PointOnPlane) is inside the specified triangle.

With reference to FIG. 7, the ray tracing tool checks (750) whether to continue for another triangle. If so ("yes" path), the ray tracing tool selects (710) another triangle. If testing multiple triangles, the triangles can be sorted from closest to farthest, to find the best intersection point earlier.

V. Ray-Triangle Intersection Testing Using Tetrahedral Bounding Planes

This section describes various examples of ray-triangle intersection tests that use specially-defined plane data—plane data for tetrahedral bounding planes, which represent triangles of a tetrahedral cluster. By using plane data for tetrahedral bounding planes, ray-triangle intersection testing operations are still computationally efficient, and overall storage costs for plane data that represents triangles can be reduced.

A. Introduction to Tetrahedral Bounding Planes and Scaling.

Ray-triangle intersection testing that uses tetrahedral bounding planes finds an intersection point based on plane data for a face plane that includes a triangle, and computes barycentric weights based on plane data for bounding planes through edges of the triangle, instead of using vertex data and edge data for vertices of the triangle. Because triangle vertices are in 3D space, the distance from a triangle vertex to a point on the opposing edge may be computed using 3D distance between the vertex and the plane through the opposing edge, and scaled so that the distance to the vertex is 1.

For example, consider a triangle $[V_0, V_1, V_2]$ with a face normal $N_F$. A side plane through the edge containing $V_0$ and $V_1$ can be constructed for determining the barycentric weight for $V_2$. First, a normal $N_{SP}$ for the constructed plane is determined. This normal $N_{SP}$ must be perpendicular to the edge containing $V_0$ and $V_1$, which can be guaranteed with a cross product: $N_{SP}=N_F\times(V_1-V_0)$. A plane can be defined by a normal vector and a position on the plane, or implicitly its distance from the origin:

$$A\cdot x+B\cdot y+C\cdot z+d=N_{SP}\cdot X_P+d=0,$$

where $X_P$ represents any point on the plane, and d represents the distance from the plane to the world origin in the coordinate system. Since the normal $N_{SP}$ for the side plane and two vertices ($V_0$ and $V_1$) of the edge in the side plane are known, d can be determined by substituting either $V_0$ or $V_1$ into the equation for the point $X_P$.

$$d=-N_{SP}\cdot X_P, \text{ and then with substitution}$$

$$d=-N_{SP}\cdot V_0=-N_{SP}\cdot V_1.$$

For the equation $N_{SP}\cdot X_P-N_{SP}\cdot V_0=0$, all points $X_P$ that satisfy the equation are on the side plane. It follows that the distance between any of the points $X_P$ on the side plane and the side plane is zero. To scale the side plane such that the distance from the side plane to $V_2$ is 1, the plane is scaled by the reciprocal of the distance to $V_2$.

$$\text{Distance}_{V2}=N_{SP}\cdot V_2-N_{SP}\cdot V_0, \text{ whose reciprocal is;}$$

$$\text{Scale}_{V2}=\text{Distance}_{V2}^{-1}.$$

The scaled side plane, which can be used to compute a barycentric weight relative to $V_2$, is, as an implicit plane equation:

$$\text{SidePlaneOpp}_{V2}=[N_{SP}, -N_{SP}\cdot V_0]\cdot\text{Scale}_{V2}.$$

Figure 9A:
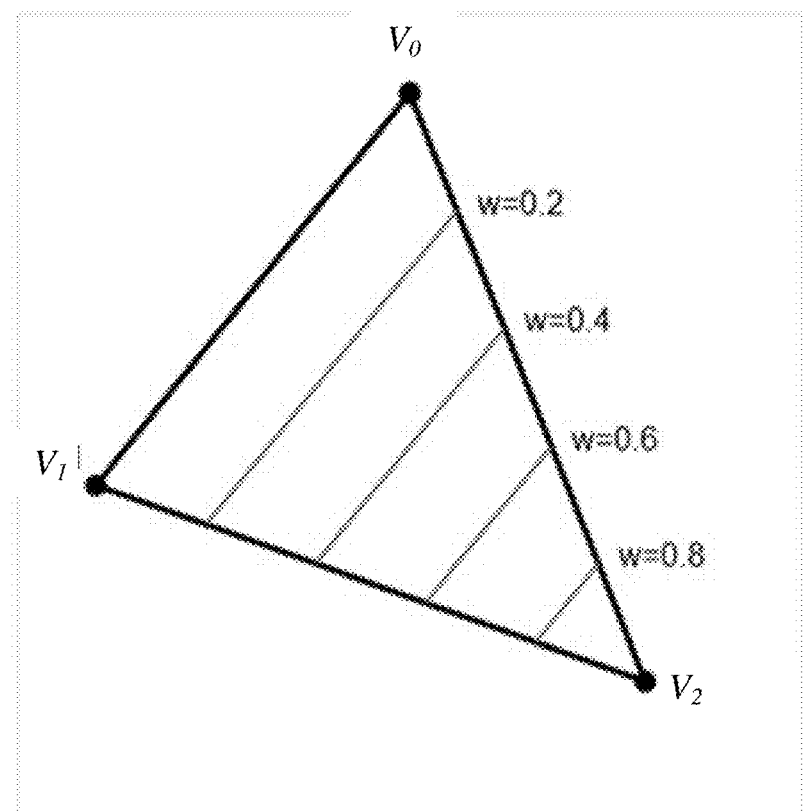
FIG. 9a is a diagram illustrating a top view of a triangle and barycentric isoplanes.
Figure 9B:
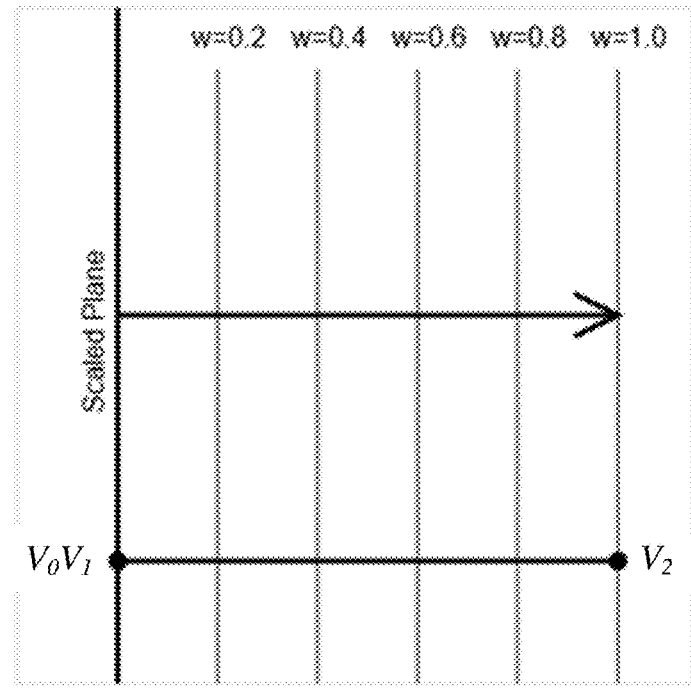
FIG. 9b is a diagram illustrating a side view of a triangle with a scaled side plane and isoplanes.

FIG. 9a shows a top view (900) of a triangle $[V_0, V_1, V_2]$ and barycentric isoclines for $V_2$. FIG. 9b shows a side view (910) of the triangle $[V_0, V_1, V_2]$, with a scaled side plane perpendicular to the face plane of the triangle, and with barycentric isoplanes. Any point on the edge $E_1$ that contains $V_0$ and $V_1$ (or elsewhere on the scaled side plane) has a barycentric weight of 0, $V_2$ has a barycentric weight of 1, and any point in between has a barycentric weight between 0 and 1.

In the preceding example, the normal $N_F$ of the face plane that includes the triangle is used in the process of generating the side plane normal $N_{SP}$. The side plane normal $N_{SP}$ is thus perpendicular to the face plane normal (as well as the edge $E_1$), but the side plane normal $N_{SP}$ does not need to be perpendicular to the face plane normal. The side plane normal can be used in subsequent ray-triangle intersection testing so long as the side plane normal $N_{SP}$ is perpendicular to the edge $E_1$ and not parallel to the face plane normal. (If the side plane is parallel to the face plane (that is, the side plane normal and face plane normal are parallel), the distance from the side plane to all three vertices of the triangle will be 0, which would result in division by zero during some ray-triangle intersection testing operations.)

Figure 9C:
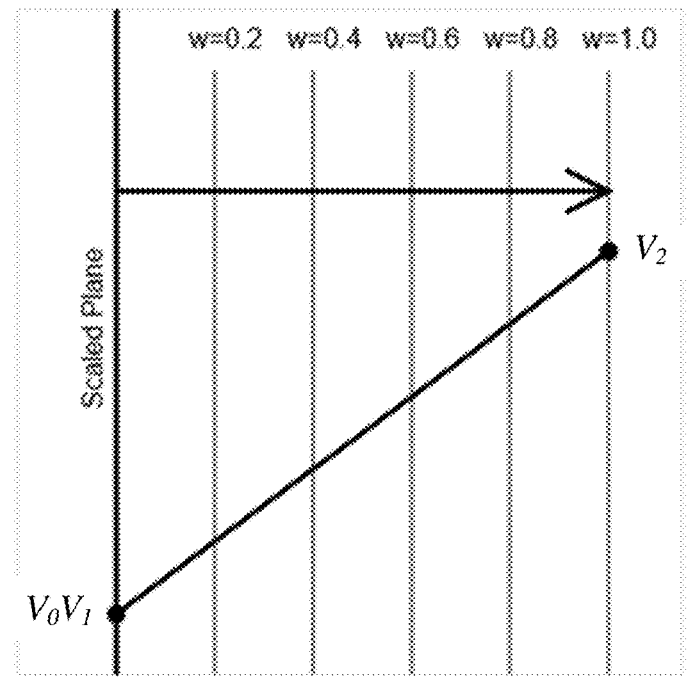
FIG. 9c is a diagram illustrating a side view of a triangle with a rotated side plane and isoplanes.

So long as these constraints are satisfied, the side plane can be rotated around the edge $E_1$. FIG. 9c illustrates a side view (920) of the triangle $[V_0, V_1, V_2]$ with a rotated side plane and isoplanes. Rotating the side plane around the edge $E_1$ should preserve the properties that the planar distances from the side plane to $V_0$ and $V_1$ are zero, and the distance from the side plane to $V_2$ is non-zero, which allows for the side plane to be scaled in various ways to make other aspects of ray-triangle intersection testing more efficient.

Scaling a plane does not affect the result of ray-intersection testing. Suppose a ray with an origin O and direction dir is defined as O+dir*t, and suppose a face plane is defined with a normal vector $N_F$ and distance d. An intersection point between the ray and the face plane $[N_F, d]$ can be determined by finding the intersection distance t, such that the distance from the face plane (containing the intersection point) is 0.

$$N_F\cdot(O+\text{dir}*t)+d=0, \text{ which becomes:}$$

$$N_F\cdot O+N_F\cdot\text{dir}*t+d=0, \text{ which becomes:}$$

$$N_F\cdot O+d=-N_F\cdot\text{dir}*t, \text{ which becomes:}$$

$$(N_F\cdot O+d)/(-N_F\cdot\text{dir})=t.$$

If the plane is scaled by a factor of s, such that $s*[N_F, d]=[s*N_F, s*d]$, then:

$$t=(s*N_F\cdot O+s*d)/(-s*N_F\cdot\text{dir}), \text{ which becomes:}$$

$$t=(s*(N_F\cdot O+d))/(-s*(N_F\cdot\text{dir})), \text{ which becomes:}$$

$$t=(N_F\cdot O+d)/(-N_F\cdot\text{dir}).$$

Thus, the scaling factor s can be eliminated without affecting the intersection distance, and the intersection point can be computed by substituting t into the ray equation O+dir*t.

A tetrahedral cluster can be formed for multiple adjacent non-coplanar triangles, and plane data for a set of planes of the tetrahedral cluster can be used to compute barycentric weights for intersection points in the respective triangles. For two non-coplanar triangles that share an edge (i.e., are adjacent), each triangle's plane can be used to 1) determine an intersection point on the plane and 2) compute a barycentric weight of the intersection point relative to one opposing vertex from the other triangle.

Figure 10A:
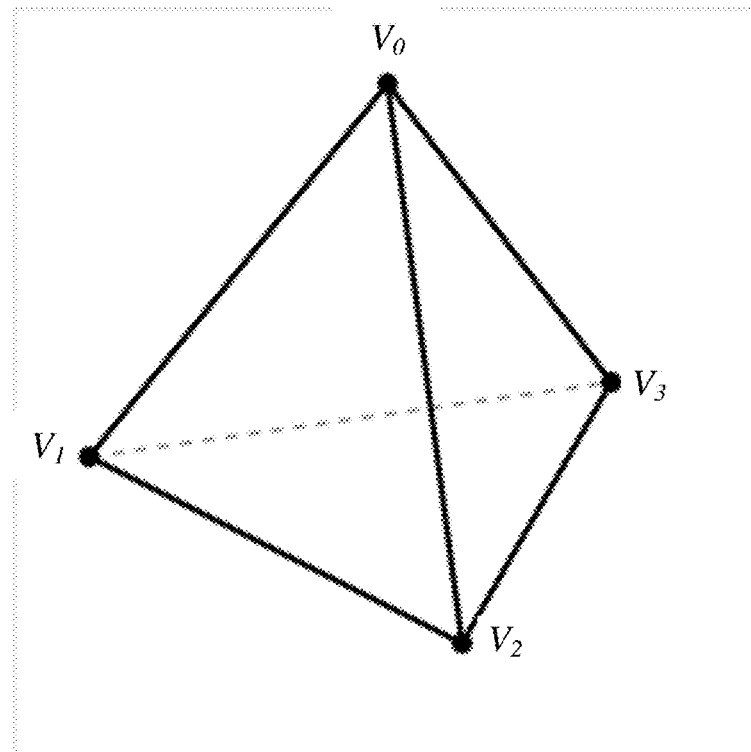
FIG. 10a is a diagram illustrating two adjacent, non-coplanar triangles that define a tetrahedron.

FIG. 10a illustrates a tetrahedron (1000) that is defined by two adjacent triangles $[V_0, V_1, V_2]$ and $[V_0, V_2, V_3]$. The tetrahedron (1000) is $[V_0, V_1, V_2, V_3]$. Each triangle's plane contains a shared edge (including $V_0$ and $V_2$) and is not parallel to the other triangle's plane. The plane containing the first triangle $[V_0, V_1, V_2]$ can be scaled such that the distance from the scaled plane to $V_3$ is 1. Likewise, the plane containing the second triangle $[V_0, V_2, V_3]$ can be scaled such that the distance from the second plane to $V_1$ is 1. With these two planes, intersection points in the two planes can be computed as well as one barycentric weight per intersection point (relative to the opposing vertex for the plane). For example, a barycentric weight for an intersection point in the plane that contains the triangle $[V_0, V_1, V_2]$ can be computed relative to vertex $V_1$. As another example, a barycentric weight for an intersection point in the plane that contains the triangle $[V_0, V_2, V_3]$ can be computed relative to vertex $V_3$.

Figure 10B:
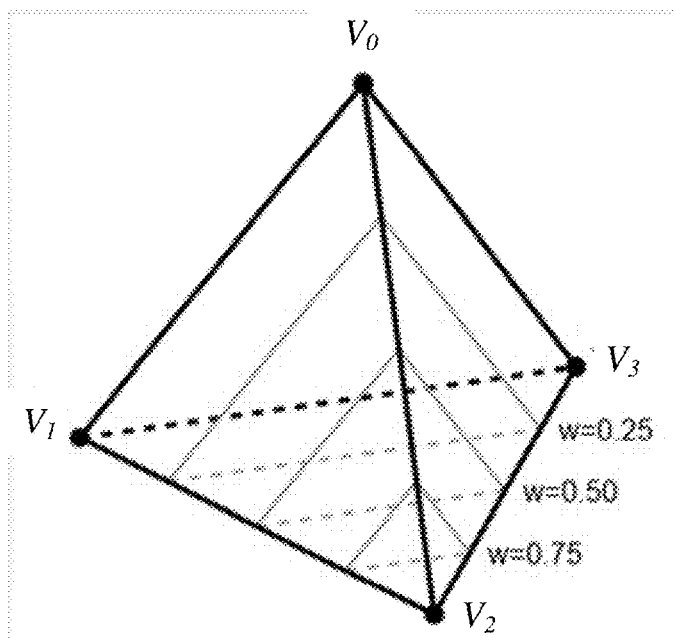
FIG. 10b is a diagram illustrating two adjacent non-coplanar triangles defining a tetrahedron and barycentric isoplanes of a vertex.

To determine whether an intersection point is inside a triangle, two barycentric weights are computed for the intersection point. (The third barycentric weight is implied, since the sum of the three weights is 1.) One barycentric weight per intersection point can be computed as described in the previous paragraph. This leaves the shared vertices, $V_0$ and $V_2$. $V_2$ is opposite the edges $V_0V_1$ and $V_0V_3$. A plane can be formed that contains both edges, and that plane can be used to compute a barycentric weight relative to $V_2$ for an intersection point in the plane that includes triangle $[V_0, V_1, V_2]$ or in the plane that includes $[V_0, V_2, V_3]$. FIG. 10b shows a tetrahedron (1010) with a plane through a notional triangle $[V_0, V_3, V_1]$ and barycentric isoplanes from the plane to $V_2$. (Alternatively, a plane containing $V_1V_2$ and $V_2V_3$, and hence triangle $[V_1, V_2, V_3]$, can be formed and used to compute a barycentric weight relative to $V_0$.) The intersection of these four planes is the tetrahedron $[V_0, V_1, V_2, V_3]$, with the two triangles $[V_0, V_1, V_2]$ and $[V_0, V_2, V_3]$ defining two of its faces.

If the tetrahedral cluster already includes an actual triangle $[V_0, V_3, V_1]$ or $[V_1, V_2, V_3]$, a plane that contains the actual triangle can be used instead of a constructed, notional triangle. Given three triangles that share one common vertex and each have one edge in common with each of the other two, planes containing the three triangles can be used to determine intersection points in the respective planes and compute barycentric weights for the intersection points, relative to planes that contain the adjacent triangles. For example, given triangles $[V_0, V_1, V_2]$, $[V_0, V_2, V_3]$, and $[V_0, V_3, V_1]$, the plane containing the first triangle $[V_0, V_1, V_2]$ can be used to compute a barycentric weight relative to $V_3$ for an intersection point in triangle $[V_0, V_2, V_3]$ or triangle $[V_0, V_3, V_1]$. The plane containing the second triangle $[V_0, V_2, V_3]$ can be used to compute a barycentric weight relative to $V_1$ for an intersection point in triangle $[V_0, V_1, V_2]$ or triangle $[V_0, V_3, V_1]$. The plane containing the third triangle $[V_0, V_3, V_1]$ can be used to compute a barycentric weight relative to $V_2$ for an intersection point in triangle $[V_0, V_1, V_2]$ or triangle $[V_0, V_2, V_3]$.

Triangle barycentric weights determine a point on a plane relative to three vertices. In tetrahedral space, four barycentric weights indicate a point in 3D space relative to the four vertices of a tetrahedron. When a point lies on a face of the tetrahedron, however, one of the four barycentric weights is 0, and the remaining three weights are barycentric weights for the triangle that is the face of the tetrahedron.

B. Applications and Properties of Tetrahedral Bounding Planes.

For ray tracing, a bounding volume hierarchy ("BVH") can be constructed to accelerate ray-triangle intersection testing. Each leaf node of the BVH contains one or more triangles. Many triangles are connected in the form of triangle meshes, such as triangles in a "fan" configuration that meet at a shared vertex. It is possible to compactly represent one, two, or three triangles using the same scaled tetrahedral bounding planes. For example, tetrahedral bounding planes for a cluster of two or three adjacent triangles can be used to represent those triangles in a leaf node. A given leaf node can contain bounding planes for one or more tetrahedral clusters, with metadata indicating how the tetrahedral clusters are organized. In special cases (e.g., one remaining triangle in a leaf node, or adjacent triangles that are coplanar or nearly coplanar), a tetrahedral cluster can include bounding planes to represent a single triangle.

As explained in section IV, ray-triangle intersection testing using plane data is more computationally efficient than ray-triangle intersection testing using vertex data and edge data. Previously, the improvement in computational efficiency has come at the cost of higher memory usage (to store plane data, compared to vertex data/edge data) and pre-processing operations (to compute plane data from vertex data/edge data). When testing two or three adjacent triangles of a tetrahedral cluster, however, the same tetrahedral bounding planes can be used. Thus, overall memory usage need not increase for ray-triangle intersection testing that uses plane data, which still provides improvements in computational efficiency.

Furthermore, in some example implementations, the size of plane data is a multiple of 64 bytes, which makes it more amenable to cache alignment. For example, the plane data for a tetrahedral cluster consumes 48 bytes-12 floating-point values, at four bytes each. Unique triangle IDs and property value information (e.g., about color, reflectivity, scattering, refraction, diffusion, etc.) can be stored in another 16-byte field, to round up the memory cost per triangle cluster to 64 bytes. In many computer architectures, caches are 64 or 128 byte-aligned.

Scaling of a plane can, in some cases, negate the normal vector of the plane. The negation of the normal vector can affect decisions made during back-face culling operations during a ray-triangle intersection test. For this reason, a flag value can be determined when a plane is scaled, which indicates whether the plane (specifically, its normal vector) and triangle in the plane face the same direction. The flag value can be stored as a bit (e.g., high bit) of a triangle ID or stored in some other way. Examples of setting and using such flag values are described below.

Coplanar triangles form a degenerate tetrahedral volume. When grouping adjacent triangles into tetrahedral clusters for ray-triangle intersection testing, coplanar or nearly coplanar triangles may present a precision hazard that increases as the distance from one plane to the opposing vertex approaches zero. To avoid grouping coplanar or nearly coplanar triangles into a cluster, a threshold value can be used when determining if two (or three) adjacent triangles may be clustered. Examples of threshold values are described below. Thus, when two adjacent coplanar triangles form a quadrilateral, these triangles are broken into separate clusters, although each triangle might be clustered with other (non-coplanar) neighbors.

If tetrahedral bounding planes are defined in "world space" (relative to a world origin of a coordinate system), ray-triangle intersection testing operations may suffer from a different precision problem. With floating-point numbers, precision of operations tends to improve as results are closer to zero. In ray-triangle intersection testing, adding floating-point values with very different exponents can hurt precision. In particular, distance values for planes relative to a world origin often contribute to such precision problems. Therefore, in some example implementations, tetrahedral bounding planes are defined using a shared vertex such as $V_0$, which provides a local origin, instead of distance values relative to a world origin. Thus, the planes are defined relative to the local origin. The distances from the planes to the world origin become zero, and can be ignored. In this formulation, the tetrahedral planes are defined as planes containing the vertex $V_0$, with normal vectors scaled by the reciprocal distance to their opposing vertices. When intersecting a ray with the $V_0$-relative planes, the vertex $V_0$ is subtracted from the ray origin to place the ray origin relative to the new, local origin, and distance terms are omitted from plane-distance equations. By defining the planes relative to a local origin instead of the world origin, precision is improved. Also, defining the planes relative to a local origin can provide a benefit in terms of computational cost. Adjusting the ray origin by subtracting the vertex $V_0$ requires three subtraction operations (one per component of the vertex). This added cost is offset by a saving of three addition operations (involving the components of a distance) per triangle test.

C. Example Approaches to Computing Scaled Tetrahedral Bounding Planes.

Figure 11:
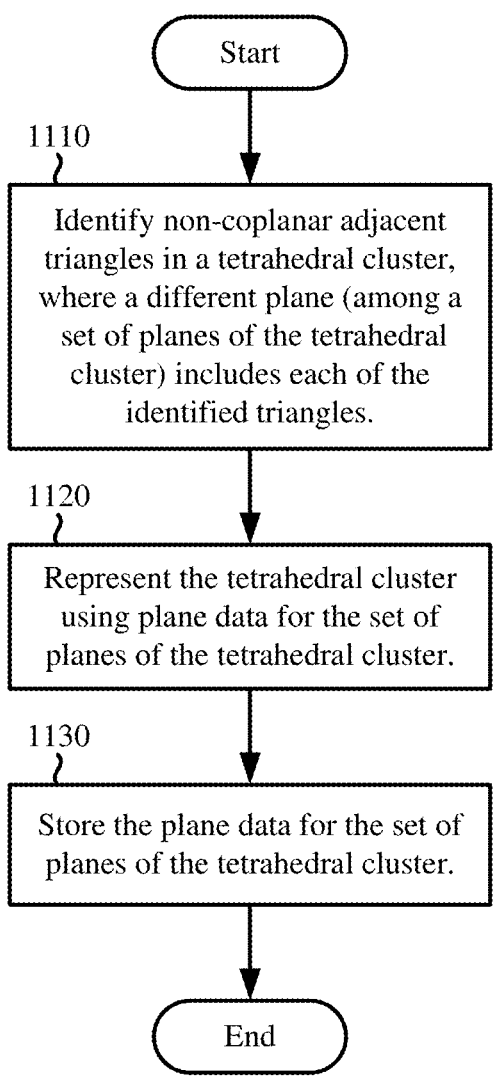
FIG. 11 is a flowchart illustrating a generalized technique for pre-computing plane data for a tetrahedral cluster of adjacent non-coplanar triangles.

FIG. 11 shows a generalized technique (1100) for pre-computing plane data for a tetrahedral cluster of adjacent non-coplanar triangles in a computer-represented environment. The plane data for the tetrahedral cluster can subsequently be used for ray tracing. The technique (1100) can be performed, for example, by one or more processing units of a computer system that implements a graphics tool or other ray tracing tool. In some example implementations, the processing units are shader units or other processing blocks of a GPU. Alternatively, the processing units can be processor cores of one or more CPUs.

The ray tracing tool identifies (1110) multiple non-coplanar adjacent triangles in a tetrahedral cluster. A different plane, among a set of planes of the tetrahedral cluster, includes each of the identified triangles. In general, any two of the identified triangles share at least one edge of the tetrahedral cluster, and the identified triangles define at least some faces of the tetrahedral cluster. For example, the ray tracing tool can identify three triangles of the tetrahedral cluster, and the set of planes of the tetrahedral cluster are three planes that include the three identified triangles, respectively. Or, the ray tracing tool can identify two triangles of the tetrahedral cluster, and the set of planes of the tetrahedral cluster are two planes that include the two identified triangles, respectively, and another, third plane that includes a non-identified, notional triangle having an edge from each of the two identified triangles. Alternatively, the ray tracing tool can identify a single triangle of a (degenerate) tetrahedral cluster, and the set of planes of the tetrahedral cluster are a plane that includes the identified triangle, plus two other planes through edges of the identified triangle.

None of the planes of the tetrahedral cluster are parallel to each other. When identifying the multiple non-coplanar adjacent triangles, the ray tracing tool can check that adjacent triangles are not parallel or substantially parallel. For example, the ray tracing tool can determine whether two adjacent triangles, having an angle between them, are at least substantially coplanar based at least in part on a comparison of the angle to a threshold angle, which depends on implementation. Or, for an identified triangle, the ray tracing tool can determine whether adjacent triangles are at least substantially coplanar based at least in part on a comparison of (a) a threshold distance and (b) a distance from the plane that includes the identified triangle to a vertex that is in the tetrahedral cluster but not in the identified triangle. If the distance is very small, the adjacent planes are at least substantially coplanar with each other.

The ray tracing tool represents (1120) the tetrahedral cluster using plane data for the set of planes of the tetrahedral cluster. The plane data for the set of planes of the tetrahedral cluster includes, for each plane of the set of planes of the tetrahedral cluster, a normal of the plane. The plane data for the set of planes of the tetrahedral cluster also includes a vertex in the tetrahedral cluster or, alternatively, for each plane of the set of planes of the tetrahedral cluster, a distance from a world origin to the plane. The plane data for the set of planes of the tetrahedral cluster can also include unique triangle IDs for the identified triangles and/or property values (e.g., color, albedo, scattering, refraction, diffusion) for the identified triangles (or their vertices).

For each of the planes in the set of planes of the tetrahedral cluster, the ray tracing tool can scale the plane by a scaling factor, which is based on a distance between the plane and a vertex that is in the tetrahedral cluster but not in the plane. For example, the scaling factor makes the distance between the plane and the vertex equal to 1.

Scaling a plane can, in some cases, negate the normal vector of the plane, which can affect back-face culling operations in ray-triangle intersection testing. The ray tracing tool can guard against the effects of negation in scaling by, for each of the identified triangles, determining whether the identified triangle and the plane that includes the identified triangle face the same direction. The ray tracing tool can then set a flag (e.g., in the plane data for the set of planes of the tetrahedral cluster) that indicates whether the identified triangle and the plane that includes the identified triangle face the same direction. During ray-triangle intersection testing, the ray tracing tool can use the flag to adjust a value considered in back-face culling decision.

The ray tracing tool stores (1130) the plane data for the set of planes of the tetrahedral cluster, e.g., in a buffer or other memory.

D. Example Implementations for Computing Scaled Bounding Planes.

FIG. 12a is an HLSL code listing (1201) for an example implementation of pre-computing plane data for a single triangle. FIGS. 12b-12c are HLSL code listings (1202-1203) for an example implementation of pre-computing plane data for a tetrahedral cluster of adjacent non-coplanar triangles.

With reference to the code listing (1201) of FIG. 12a, the function FormTrianglePlanes( ) includes operations to determine bounding planes for a single triangle. The function can be used to compute plane data for ray-triangle intersection tests when a single triangle is selected from a leaf node of a BVH. This might occur, for example, when there is a lone, isolated triangle, when there is a single remaining triangle after clustering, or when adjacent triangles are at least substantially coplanar (such that no tetrahedral cluster can be formed).

The function accepts input parameters V0, V1 and V2, which provide vertex data for three vertices $V_0$, $V_1$, and $V_2$ of a triangle [$V_0$, $V_1$, $V_2$]. Edge $E_1$ is $V_0V_1$, and edge $E_2$ is $V_0V_2$. Each input parameter includes three floating-point values (floats). The function produces output parameters N1, N2, and N3. The output parameter N1 indicates the normal vector of a face plane that includes the single triangle. The output parameters N2 and N3 indicate scaled normal vectors of two bounding planes through edges of the single triangle. Each output parameter includes three floats.

A shared vertex ($V_0$) is also used to define the plane that includes the single triangle and bounding planes. Since $V_0$ is a common vertex for all three planes, the function computes edge vector E1 for edge $E_1$ by subtracting V0 from V1, and the function computes edge vector E2 for edge $E_2$ by subtracting V0 from $V_2$. Thus, the edge vectors are based on a $V_0$-relative vertex positions.

The function computes the normal N1 of the face plane by determining the cross product of edge vectors E1 and E2. This yields a vector perpendicular to the face plane, which the function normalizes but does not scale.

The function computes the normal N2 of one bounding plane by determining the cross product of edge vector E2 and the normal N1 of the face plane. This yields a vector perpendicular to the normal N1 of the face plane and edge vector E2, which the function then normalizes and scales. Specifically, the function scales the normal N2 by the inverse of the distance between edge $E_2$ and the opposite vertex ($V_1$) of the triangle, which is calculated as the dot product of the normal N2 and edge vector E1. Thus, the function produces a scaled normal N2 of the plane opposite $V_1$.

Finally, the function computes the normal N3 of the other bounding plane by determining the cross product of edge vector E1 and the normal N1 of the face plane. This yields a vector perpendicular to the normal N1 of the face plane and edge vector E1, which the function then normalizes and scales. Specifically, the function scales the normal N3 by the inverse of the distance between edge $E_1$ and the opposite vertex ($V_2$) of the triangle, which is calculated as the dot product of the normal N3 and edge vector E2. Thus, the function produces a scaled normal N3 of the plane opposite $V_2$.

With reference to the code listings (1202-1203) of FIGS. 12b and 12c, the function FormTetrahedralPlanes( ) includes operations to determine three tetrahedral bounding planes for two or three adjacent, non-coplanar triangles in a tetrahedral cluster. The function can be used to compute plane data for ray-triangle intersection tests when multiple triangles are selected from a leaf node of a BVH.

The function accepts input parameters V0, V1, V2, and V3, which provide vertex data for four vertices $V_0$, $V_1$, $V_2$, and $V_3$ of a tetrahedral cluster. The vertex $V_0$ is the apex of the tetrahedral cluster, and the vertex $V_0$ is shared been the two or three adjacent, non-coplanar triangles. Triangle 1 is [$V_0$, $V_1$, $V_2$]. Triangle 2 is [$V_0$, $V_2$, $V_3$]. Triangle 3 is [$V_0$, $V_3$, $V_1$]. Each input parameter includes three floats. The function produces output parameters N1, N2, and N3 (three floats each), which indicate scaled normal vectors of the planes that include triangle 1, triangle 2, and triangle 3, respectively. The shared vertex ($V_0$) is also used to define the three planes. The function also produces output parameters N1Reversed, N2Reversed, and N3Reversed (one Boolean value each), which indicate whether a scaled normal vector is negated (1) or not negated (0) by scaling operations. The function returns a Boolean value that indicates whether the function completes successfully—that is, the Boolean value indicates whether the tetrahedral cluster is valid (true) or degenerate (false).

Since $V_0$ is a common vertex for all three planes, the function computes an edge vector E1 for edge $E_1$ by subtracting V0 from V1, computes an edge vector E2 for edge $E_2$ by subtracting V0 from V2, and computes an edge vector E3 for edge $E_3$ by subtracting V0 from V3. Thus, the edge vectors are based on a $V_0$-relative vertex positions.

The function computes the normal N1 of the plane that includes triangle 1 by determining the cross product of edge vectors E1 and E2. This yields a vector perpendicular to the plane that includes edges $E_1$ and $E_2$, which the function then normalizes and scales. Specifically, the function computes the distance (DistToV3) between the plane (that includes edges $E_1$ and $E_2$) and the opposite vertex ($V_3$) of the tetrahedral cluster, which is calculated as the dot product of the normal N1 and edge vector E3. The function checks if the distance (DistToV3) is less than a threshold distance (EPSILON). If so, the tetrahedron is a special-case tetrahedron having some coplanar (or at least substantially coplanar) faces, and the function returns false. (In this case, plane data can then be computed using the function FormTrianglePlanes( ) as shown in FIG. 11a.) Otherwise, the function sets the output parameter N1Reversed depending on whether the distance (DistToV3) is less than 0.0. Finally, the function scales the normal N1 by the inverse of the distance (DistToV3). Thus, the function produces a scaled normal N1 of the plane that includes triangle 1 and is opposite $V_3$.

The function similarly produces a scaled normal N2 of the plane that includes triangle 2 and is opposite $V_1$, along with a flag N2Reversed. The function then produces a scaled normal N3 of the plane that includes triangle 3 and is opposite $V_2$, along with a flag N3Reversed. Finally, the function returns a Boolean value of true to indicate the function has completed successfully (that is, the tetrahedral cluster is valid).

E. Example Approaches to Ray-Triangle Intersection Testing Using Tetrahedral Bounding Planes.

Figure 13A:
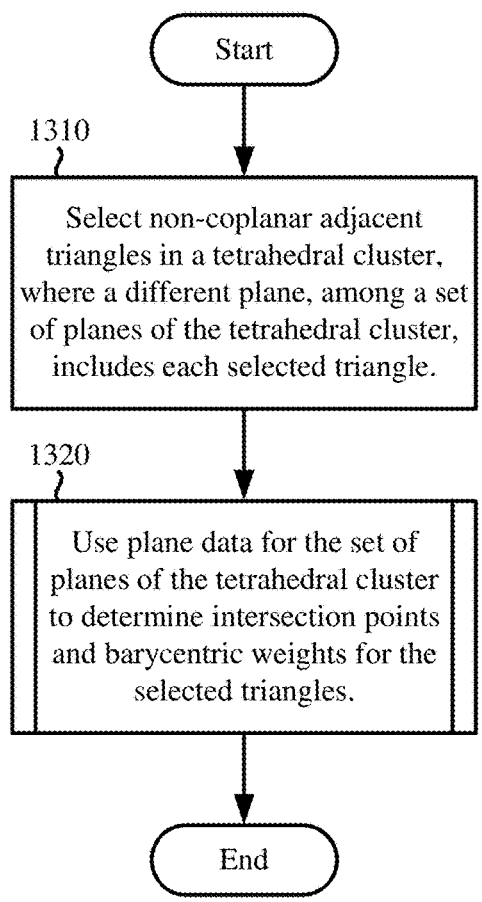
FIGS. 13a and 13b are flowcharts illustrating a generalized technique for performing ray-triangle intersection tests using pre-computed plane data for a tetrahedral cluster of adjacent non-coplanar triangles.
Figure 13B:
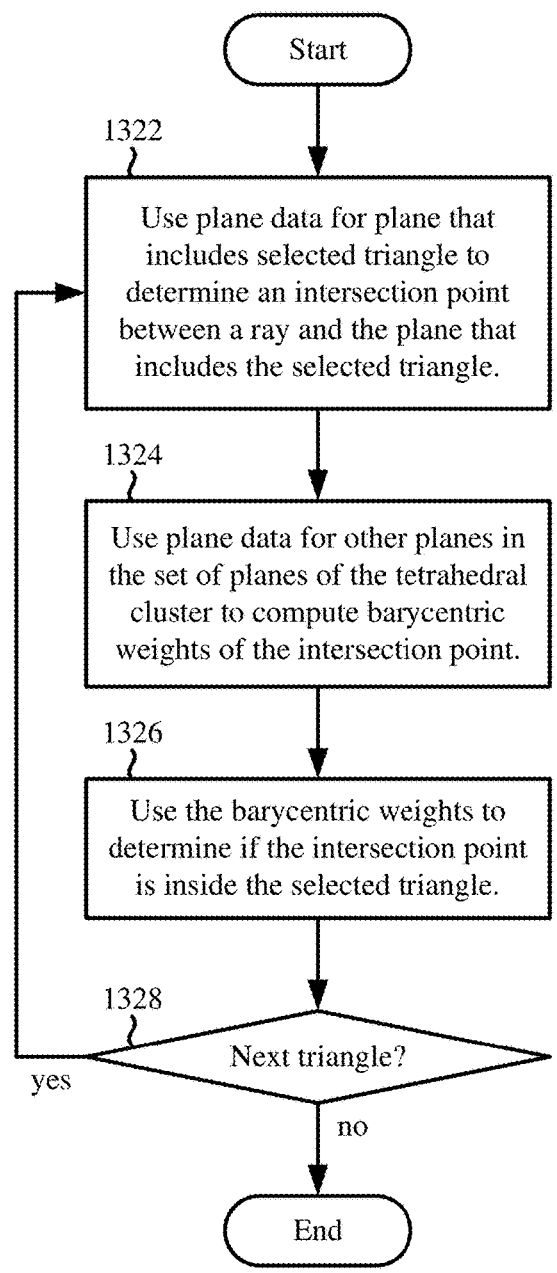

FIGS. 13a and 13b show a generalized technique (1300) for performing ray-triangle intersection tests using pre-computed plane data for a tetrahedral cluster of adjacent non-coplanar triangles during ray tracing in a computer-represented environment, which includes multiple triangles. The technique (1300) can be performed, for example, by one or more processing units of a computer system that implements a graphics tool or other ray tracing tool. In some example implementations, the processing units are shader units or other processing blocks of a GPU. Alternatively, the processing units can be processor cores of one or more CPUs.

With reference to FIG. 13a, the ray tracing tool selects (1310) multiple non-coplanar adjacent triangles in a tetrahedral cluster. A different plane, among a set of planes of the tetrahedral cluster, includes each of the selected triangles. In general, any two of the selected triangles share at least one edge of the tetrahedral cluster, and the selected triangles define at least some faces of the tetrahedral cluster. For example, the set of planes of the tetrahedral cluster is a set of three planes. If the ray tracing tool selects three triangles, the set of planes of the tetrahedral cluster are the planes that include the selected triangles. If the ray tracing tool selects two triangles, the set of planes of the tetrahedral cluster are two planes that include the two selected triangles and a third plane that includes a non-selected (possibly notional) triangle having an edge from each of the two selected triangles. None of the planes of the set of planes of the tetrahedral cluster are parallel to each other.

For each plane of the set of planes of the tetrahedral cluster, the plane can be scaled by a scaling factor. The scaling factor is based on a distance between the plane and a vertex that is in the tetrahedral cluster but not in the plane. The scaling factor makes the distance equal to 1 between the plane and the vertex that is in the tetrahedral cluster but not in the plane.

The ray tracing tool uses (1320) plane data for the set of planes of the tetrahedral cluster to determine intersection points and barycentric weights for the selected triangles. For example, the ray tracing tool performs operations as shown in FIG. 13b. Alternatively, the ray tracing tool performs other operations that use plane data for the set of planes of the tetrahedral cluster to determine intersection points and barycentric weights for the selected triangles.

With reference to FIG. 13b, for each of the selected triangles, the ray tracing tool uses (1322) plane data for the plane that includes the selected triangle to determine an intersection point between a ray and the plane that includes the selected triangle. The ray tracing tool uses (1324) plane data for other planes in the set of planes of the tetrahedral cluster to compute barycentric weights of the intersection point, and then uses (1326) the barycentric weights to determine if the intersection point is inside the selected triangle. For example, suppose the ray tracing tool selects three triangles of the tetrahedral cluster. In this case, for a given one of the three selected triangles, the other planes are planes that include the other two selected triangles. Or, suppose the ray tracing tool selects two triangles of the tetrahedral cluster. In this case, for a given one of the two selected triangles, the other planes include (1) a first other plane that includes the other selected triangle, and (2) a second other plane that includes a non-selected (possibly notional) triangle having an edge from each of the two selected triangles. The ray tracing tool checks (1328) whether to continue for another triangle. If so ("yes" path), the ray tracing tool continues with the ray-triangle intersection test operations for the next selected triangle.

In some example implementations, the plane data for the set of planes of the tetrahedral cluster includes, for each plane in the set of planes, a normal of the plane and a distance from a world origin to the plane. The ray tracing tool can use such plane data to determine an intersection point and compute barycentric weights, for example, as shown in the code listings (1401-1406) of FIGS. 14a-14f. In general, for this configuration of plane data, when using the plane data for the plane that includes the selected triangle to determine the intersection point, the ray tracing tool can compute the distance from the ray origin to the intersection point based on (1) the distance from the world origin to the plane that includes the selected triangle, (2) the dot product of (a) the normal of the plane that includes the selected triangle and (b) the origin of the ray, and (3) the dot product of (a) the normal of the plane that includes the selected triangle and (b) the ray direction. The ray tracing tool can check if the intersection point is behind the ray origin or if the selected triangle is back-facing. The ray tracing tool can then compute the intersection point based on the origin of the ray, the direction of the ray, and the distance from the origin of the ray to the intersection point. When using the plane data for other planes in the set of planes of the tetrahedral cluster to compute barycentric weights of the intersection point, the ray tracing tool can compute a first barycentric weight based on (1) the distance from the world origin to a first one of the other planes, and (2) a dot product of (a) the normal of the first other plane and (b) the intersection point. The ray tracing tool can compute a second barycentric weight based on (1) the distance from the world origin to a second one of the other planes, and (2) a dot product of (a) the normal of the second other plane and (b) the intersection point.

In other example implementations, the plane data for the set of planes of the tetrahedral cluster includes a vertex in the tetrahedral cluster, which is shared between the selected triangles. The plane data for the set of planes of the tetrahedral cluster further includes, for each plane in the set of planes, a normal of the plane. The ray tracing tool can use such plane data to determine an intersection point and compute barycentric weights, for example, as shown in the code listings (1501-1507) of FIGS. 15a-15g or in the code listings (1601-1608) of FIGS. 16a-16h. In general, for this configuration of plane data, the ray tracing tool adjusts the ray origin by subtracting the vertex. When using the plane data for the plane that includes the selected triangle to determine the intersection point, the ray tracing tool can compute the distance from the ray origin to the intersection point based on (1) the dot product of (a) the normal of the plane that includes the selected triangle and (b) the ray origin, and (2) the dot product of (a) the normal of the plane that includes the selected triangle and (b) the ray direction. The ray tracing tool can check if the intersection point is behind the origin of the ray or if the selected triangle is back-facing. The ray tracing tool can then compute the intersection point based on the ray origin, the ray direction, and the distance from the ray origin to the intersection point. When using the plane data for other planes in the set of planes of the tetrahedral cluster to compute barycentric weights of the intersection point, the ray tracing tool can compute a first barycentric weight based on a dot product of (a) the normal of a first one of the other planes and (b) the intersection point. The ray tracing tool can compute a second barycentric weight based on a dot product of (a) the normal of a second one of the other planes and (b) the intersection point.

When plane data are pre-processed, scaling a plane can, in some cases, negate the normal vector of the plane, which can affect back-face culling operations in ray-triangle intersection testing. As part of ray-triangle intersection testing, the ray tracing tool can, for each of the selected triangles, receive a flag that indicates whether the selected triangle and the plane that includes the selected triangle face the same direction. The ray tracing tool can use the flag when checking if the selected triangle is back-facing. In this way, the ray tracing tool can guard against the effects of negation from scaling.

F. Example Implementations of Ray-Triangle Intersection Testing Using Tetrahedral Bounding Planes.

FIGS. 14a-14f, 15a-15g, and 16a-16h are HLSL code listings for different example implementations of ray-triangle intersection testing with plane data for tetrahedral bounding planes.

1. First Example Implementation

FIGS. 14a-14f are HLSL code listings (1401-1406) for a first example implementation of ray-triangle intersection testing with plane data for tetrahedral bounding planes.

FIG. 14a shows a function TestRayTriangleIntersection1( ) that tests for a ray-triangle intersection between a ray and single triangle of a tetrahedral cluster using plane data for tetrahedral bounding planes. The function accepts input parameters that specify the origin of a ray (RayOrigin), the direction of the ray (RayDirection), and three face planes (FacePlane1, FacePlane2, FacePlane3) of the (degenerate) tetrahedral cluster. Each face plane is parameterized as a normal vector (.xyz) and distance (.w) relative to a world origin. The first face plane includes the triangle, and its normal vector is not scaled. The normal vectors of the second and third face planes have been scaled by reciprocal distance to opposing vertices in the tetrahedral cluster. The function produces an output parameter (bary1) that specifies barycentric weights for an intersection point between the ray and the triangle in the first face plane. The function also produces an output parameter (T1) that indicates a distance to the intersection point, if the intersection point is valid.

As shown in FIG. 14a, the function TestRayTriangleIntersection1( ) uses the plane data for the first face plane to determine the intersection point. In particular, the function computes a variable Denom by negating the dot product of the normal vector (FacePlane1.xyz) of the first face plane and the ray direction (RayDirection). The function computes the distance from the ray origin (RayOrigin) to the intersection point by adding (1) the distance (FacePlane1.w) from the world origin to the first face plane to (2) the dot product of (a) the normal of the face plane (FacePlane1.xyz) and ray origin (RayOrigin), and then dividing the sum by (3) the variable Denom. (In this function, the three face planes are understood to be non-coplanar, based on how the second and third face planes were constructed. The function does not check if the ray is at least substantially parallel to the first face plane. Denom is non-zero, which avoids the risk of dividing by zero.)

The function checks if the triangle is back-facing and also checks if the intersection point is behind the origin of the ray. (Since the normal N1 for the first face plane was not scaled, the function need not check a flag value to guard against the effects of negation in scaling.) If the variable Denom is less than zero, the triangle is back-facing. If the distance T1 is less than zero, the intersection point is behind the ray origin. Specifically, the function compares the lesser of the distance value T1 and variable Denom to a threshold distance (EPSILON), which is very close to zero. If the triangle is back-facing or the intersection point is behind the ray origin, the function sets the distance value T1 to FLT_MAX, which indicates no valid intersection point has been found.

The function computes the intersection point (PointOnPlane) based on the ray origin, the ray direction, and the distance from the ray origin to the intersection point:

PointOnPlane=RayOrigin+RayDirection*T1.

The function then uses the plane data for the two other face planes to compute barycentric weights of the intersection point. The function computes a first barycentric weight (bary.x) by adding (1) the distance (FacePlane2.w) from the world origin to the second face plane, to (2) the dot product of (a) the normal vector (FacePlane2.xyz) of the second face plane and (b) the intersection point (PointOnPlane). The function computes a second barycentric weight (bary.y) by adding (1) the distance (FacePlane3.w) from the world origin to the third face plane, to (2) the dot product of (a) the normal vector (FacePlane3.xyz) of the third face plane and (b) the intersection point (PointOnPlane).

Finally, the function checks if the first and second barycentric weights indicate the intersection point (PointOnPlane) is inside the specified triangle. Specifically, the function checks if each of the two barycentric weights (bary.x, bary.y) is at least 0.0, and the function checks if the sum of the two barycentric weights (bary.x, bary.y) is less than 1.0. If the intersection point (PointOnPlane) is not inside the specified triangle, the function sets the distance value T1 to FLT_MAX to indicate no valid intersection point has been found.

FIGS. 14b-14c show a function TestRayTriangleIntersection2( ) that tests for ray-triangle intersections between a ray and two triangles of a tetrahedral cluster using plane data for tetrahedral bounding planes. The two tested triangles are triangle 1 ([$V_0$, $V_1$, $V_2$]) and triangle 2 ([$V_0$, $V_2$, $V_3$]). The function accepts input parameters that specify the origin of a ray (RayOrigin), the direction of the ray (RayDirection), and three face planes (FacePlane1, FacePlane2, FacePlane3) of the tetrahedral cluster. Each face plane is parameterized as a normal vector (.xyz) and distance (.w) relative to a world origin. The normal vectors of the respective face planes have been scaled by reciprocal distance to opposing vertices in the tetrahedral cluster. The first face plane (FacePlane1) includes triangle 1 ([$V_0$, $V_1$, $V_2$]), and its normal vector is scaled by the reciprocal of the distance from the first face plane to vertex $V_3$. The second face plane (FacePlane2) includes triangle 2 ([$V_0$, $V_2$, $V_3$]), and its normal vector is scaled by the reciprocal of the distance from the second face plane to vertex $V_1$. The third face plane (FacePlane3) includes triangle 3 ([$V_0$, $V_3$, $V_1$]), and its normal vector is scaled by the reciprocal of the distance from the third face plane to vertex $V_2$. The input parameter Face1Reversed indicates if the first face plane (FacePlane1) and triangle 1 face the same direction. Similarly, the input parameter Face2Reversed indicates if the second face plane (FacePlane2) and triangle 2 face the same direction.

The function TestRayTriangleIntersection2( ) produces an output parameter bary1 that specifies barycentric weights for an intersection point between the ray and triangle 1 in the first face plane (FacePlane1), as well as an output parameter T1 that indicates the distance to the intersection point in triangle 1 in the first face plane (FacePlane1), if the intersection point is valid. The function similarly produces an output parameter bary2 that specifies barycentric weights for an intersection point between the ray and triangle 2 in the second face plane (FacePlane2), as well as an output parameter T2 that indicates the distance to the intersection point in triangle 2, if the intersection point is valid.

As shown in FIG. 14c, the function TestRayTriangleIntersection2( ) uses the plane data for the first face plane to determine an intersection point between the ray and the first face plane. In particular, the function computes a variable Denom1 by negating the dot product of the normal vector (FacePlane1.xyz) of the first face plane and the ray direction (RayDirection). The function computes the distance from the ray origin (RayOrigin) to the intersection point by adding (1) the distance (FacePlane1.w) from the world origin to the first face plane to (2) the dot product of (a) the normal of the face plane (FacePlane1.xyz) and ray origin (RayOrigin), and dividing the sum by (3) the variable Denom1. (In this function, the three face planes are understood to be non-coplanar, based on earlier checking when plane data is computed. The function does not check if the ray is at least substantially parallel to the first face plane. Denom1 is non-zero, which avoids the risk of dividing by zero.)

The function checks if the triangle is back-facing and also checks if the intersection point is behind the origin of the ray. If the variable Denom1 is less than zero, the triangle is back-facing. If the distance T1 is less than zero, the intersection point is behind the ray origin. The function selectively negates the variable Denom1, based on the value of Face1Reversed. Then, the function compares the lesser of the distance value T1 and variable Denom1 to a threshold distance (EPSILON), which is very close to zero. If the triangle is back-facing or the intersection point is behind the ray origin, the function sets the distance value T1 to FLT_MAX, which indicates no valid intersection point has been found.

Then, as described with reference to corresponding operations in the code listing (1401) of FIG. 14a, the function TestRayTriangleIntersection2( ) computes the intersection point (PointOnPlane1) in the first face plane (FacePlane1), uses the plane data for the two other face planes (FacePlane2, FacePlane3) to compute barycentric weights of the intersection point (PointOnPlane1), and checks if the barycentric weights indicate the intersection point (PointOnPlane1) is inside triangle 1.

Next, as shown in FIG. 14c, the function TestRayTriangleIntersection2( ) performs analogous operations to determine an intersection point (PointOnPlane2) in the second face plane (FacePlane2) and evaluate whether the intersection point (PointOnPlane2) is inside triangle 2.

FIGS. 14d-14f show a function TestRayTriangleIntersection3( ) that tests for ray-triangle intersections between a ray and three triangles of a tetrahedral cluster using plane data for tetrahedral bounding planes. The three tested triangles are triangle 1 $V_0$, $V_1$, $V_{21}$), triangle 2 ([$V_0$, $V_2$, $V_3$]), and triangle 2 ([$V_0$, $V_3$, $V_1$]). The function accepts input parameters and produces output parameters analogous to the parameters described with reference to the code listings (1402-1403) of FIGS. 14b and 14c, with the following differences. The input parameter Face3Reversed indicates if the third face plane (FacePlane3) and triangle 3 face the same direction. The function TestRayTriangleIntersection3( ) produces an output parameter bary3 that specifies barycentric weights for an intersection point between the ray and triangle 3 in the third face plane (FacePlane3), as well as an output parameter T3 that indicates the distance to the intersection point in triangle 3, if the intersection point is valid.

As shown in FIGS. 14e and 14f, the function computes the intersection point (PointOnPlane1) in the first face plane (FacePlanet), uses the plane data for the two other face planes (FacePlane2, FacePlane3) to compute barycentric weights of the intersection point (PointOnPlane1), and checks if the barycentric weights indicate the intersection point (PointOnPlane1) is inside triangle 1. The function performs analogous operations to determine an intersection point (PointOnPlane2) in the second face plane (FacePlane2), evaluate whether the intersection point (PointOnPlane2) is inside triangle 2, determine an intersection point (PointOnPlane3) in the third face plane (FacePlane3), and evaluate whether the intersection point (PointOnPlane3) is inside triangle 3. Operations shown in FIGS. 14e and 14f are analogous to operations described with reference to FIGS. 14a-14c.

After any of the three functions in FIGS. 14a-14f returns, the returned distance value(s) for the new intersection point(s) can be evaluated, along with the distance value for the previous closest intersection point found so far, to determine if any of the new intersection point(s) is better (closer, has a smaller distance value) than the previous closest intersection point found. If so, the closest intersection point is updated.

2. Second Example Implementation

FIGS. 15a-15g are HLSL code listings (1501-1507) for a second example implementation of ray-triangle intersection testing with plane data for tetrahedral bounding planes. The code listings (1501-1507) in FIGS. 15a-15g show alternate formulations for the three functions in the code listings (1401-1406) in FIGS. 14a-14f. In the code listings (1501-1507) in FIGS. 15a-15g, the input parameters include a shared vertex (Vertex0) and normal vectors (FaceNormal1, FaceNormal2, and FaceNormal3) of the three face planes, instead of normal vectors and distances relative to a world origin for the three face planes. Except as indicated below, operations for the alternate formulations of the functions are the same as operations described with reference to the code listings (1401-1406) of FIGS. 14a-14f.

To start, the origin of the ray (RayOrigin) is adjusted by subtracting the shared vertex. This effectively shifts the ray origin to be relative to the shared vertex of the tetrahedral cluster. Subsequent operations to compute distance value(s) and barycentric weights for intersection point(s) are slightly simpler, since distances relative to the world origin are no longer added. This reduces the overall number of processing cycles used by the functions when two or three triangles are tested. More significantly, the precision of floating-point operations is improved in many cases, since intermediate values are closer to zero.

3. Third Example Implementation

FIGS. 16a-16h are code listings (1601-1608) for a third example implementation of ray-triangle intersection testing with plane data for tetrahedral bounding planes.

FIGS. 16a and 16b show a function TestTriangleOneSided( ) that tests for an intersection between a ray and single triangle. To test one, two, or three triangles, TestTriangleOneSided( ) is called from TestRayTetrahedronIntersection_CullBack-faces( ) which is shown in the code listings (1603-1604) of FIGS. 16c and 16d.

The function TestRayTetrahedronIntersection_CullBackfaces( ) tests up to three triangles: triangle 1 ($[V_0, V_1, V_2]$), triangle 2 ($[V_0, V_2, V_3]$), and triangle 2 ($[V_0, V_3, V_1]$). The function checks if any of the triangles is intersected by the specified ray and is not back-facing. With reference to FIG. 16c, the function accepts input parameters that specify the origin of a ray (RayOrigin), the direction of the ray (RayDirection), a shared vertex (V0) of the three triangles, and normal vectors (FaceNormal1, FaceNormal2, FaceNormal3) of three face planes of the tetrahedral cluster. The three planes pass through the shared vertex (V0), which is treated as the origin in ray-triangle intersection testing operations. The normal vectors of the respective face planes have been scaled by reciprocal distance to opposing vertices in the tetrahedral cluster. The first face plane includes triangle 1 ($[V_0, V_1, V_2]$), and its normal vector (FaceNormal1) is scaled by the reciprocal of the distance from the first face plane to vertex $V_3$. The second face plane includes triangle 2 ($[V_0, V_2, V_3]$), and its normal vector (FaceNormal2) is scaled by the reciprocal of the distance from the second face plane to vertex $V_1$. The third face plane includes triangle 3 ($[V_0, V_3, V_1]$), and its normal vector (FaceNormal3) is scaled by the reciprocal of the distance from the third face plane to vertex $V_2$.

The input parameters also include triangle IDs (Triangle1ID, Triangle2ID, Triangle2ID) for the three triangles. The high bit of Triangle1ID indicates if the first face plane and triangle 1 face the same direction. Similarly, the high bit of Triangle2ID indicates if the second face plane and triangle 2 face the same direction, and the high bit of Triangle3ID indicates if the third face plane and triangle 3 face the same direction. If the triangle ID for a triangle is zero, the triangle is not tested. This allows the function TestRayTetrahedronIntersection_CullBack-faces( ) to be used whether one, two, or three triangles are tested. If only one triangle is tested, the tested triangle is triangle 1. If only two triangles are tested, the tested triangles are triangle 1 and triangle 2.

The input/output parameters TriangleHit, ClosestT, and ClosestBary track the closest intersection point found so far for the ray. The parameter TriangleHit indicates the triangle ID of the triangle that includes the closest intersection point found so far. The parameters ClosestT and ClosestBary indicate the distance value and barycentric weights, respectively, for the closest intersection point found so far. Before a valid intersection point has been found, the parameter ClosestT can have a maximum possible value (e.g., FLT_MAX) to indicate that no valid intersection point has been found, and the parameters TriangleHit and ClosestBary can have default or null values.

The function TestRayTetrahedronIntersection_CullBackfaces( ) adjusts the ray origin (RayOrigin) by subtracting the shared vertex (V0), and then tests the first triangle. The function calls TestTriangleOneSided0, passing the input/output parameters that indicate the closest intersection point so far (TriangleHit, ClosestT, and ClosestBary), the parameters that specify the ray (RayOrigin, RayDirection), the triangle ID of the triangle to be tested (Triangle1ID), the normal vector of the plane that includes the triangle to be tested (FaceNormal1), and the normal vectors of the two bounding planes for the triangle to be tested (FaceNormal2, FaceNormal3).

With back-face rejection, the ray can intersect at most one of the triangles. This observation allows the function TestRayTetrahedronIntersection_CullBack-faces( ) to terminate after a new closest intersection point has been found for any of the three triangles. If the call to TestTriangleOneSided( ) to test the first triangle returns successfully (returns the Boolean value true) or the triangle ID of the second triangle is zero, the function TestRayTetrahedronIntersection_CullBack-faces( ) ends. Otherwise, the function tests the second triangle. The function calls TestTriangleOneSided( ) passing the input/output parameters that indicate the closest intersection point so far (TriangleHit, ClosestT, and ClosestBary), the parameters that specify the ray (RayOrigin, RayDirection), the triangle ID of the triangle to be tested (Triangle2ID), the normal vector of the plane that includes the triangle to be tested (FaceNormal2), and the normal vectors of the two bounding planes for the triangle to be tested (FaceNormal3, FaceNormal1).

If the call to TestTriangleOneSided( ) to test the second triangle returns successfully (returns the Boolean value true) or the triangle ID of the third triangle is zero, the function TestRayTetrahedronIntersection_CullBack-faces( )ends. Otherwise, the function tests the third triangle. The function calls TestTriangleOneSided( ) passing the input/output parameters that indicate the closest intersection point so far (TriangleHit, ClosestT, and ClosestBary), the parameters that specify the ray (RayOrigin, RayDirection), the triangle ID of the triangle to be tested (Triangle3ID), the normal vector of the plane that includes the triangle to be tested (FaceNormal3), and the normal vectors of the two bounding planes for the triangle to be tested (FaceNormal1, FaceNormal2).

With reference to FIGS. 16a and 16b, the function TestTriangleOneSided( ) tests one triangle. The function accepts input parameters that specify the origin of a ray (RayOrigin), the direction of the ray (RayDirection), the normal vector of the triangle to be tested (FaceNormal), and the normal vectors of two bounding planes for the triangle to be tested (OppNormal0, OppNormal1). The normal vectors of the respective planes have been scaled by reciprocal distance to opposing vertices in the tetrahedral cluster. The input parameters also include the triangle ID (TriangleID) for the triangle to be tested. The high bit of TriangleID indicates if the face plane and tested triangle face the same direction. The triangle ID (TriangleID) that is passed to the function is different depending on the tested triangle, and the normal vectors that are passed to the function are ordered differently depending on the tested triangle. The input/output parameters ClosestTriangle, ClosestT, and ClosestBary track the closest intersection point found so far for the ray.

As shown in FIG. 16a, the function TestTriangleOneSided( ) computes a variable Denom by negating the dot product of the normal vector (FaceNormal.xyz) of the face plane and the ray direction (RayDirection). The function checks if the triangle is back-facing. The function determines the value FaceReverseSignBit from the high bit of the triangle ID (TriangleID). The function selectively negates the variable Denom, based on the value of FaceReverseSignBit. If the variable Denom is less than zero, the triangle is back-facing. Specifically, the function compares the (selectively negated) variable Denom to a threshold distance (EPSILON), which is very close to zero. If the triangle is back-facing, the function returns the Boolean value false.

The function then computes the distance T from the ray origin (RayOrigin) to the new intersection point by dividing (1) the dot product of (a) the normal of the face plane (FacePlane.xyz) and ray origin (RayOrigin), by (2) the variable Denom. (In this function, the three planes are understood to be non-coplanar, based on earlier checking when plane data is computed. The function does not check if the ray is at least substantially parallel to the first face plane. Denom is non-zero, which avoids the risk of dividing by zero.)

The function checks if the new intersection point is behind the origin of the ray and if it is further away from the ray origin than the closest intersection point found so far. If the distance T is less than zero (EPSILON is the threshold distance in FIG. 16a), the new intersection point is behind the ray origin. If the distance T is greater than ClosestT, the new intersection point is further away from the ray origin than the closest intersection point found so far. In either case, the function returns the Boolean value false.

Otherwise (the new intersection point is in front of the ray origin and closer than the closest intersection point found so far), the function computes the intersection point (PointOnPlane) in the face plane as the ray origin (RayOrigin) plus the ray direction (RayDirection) times the distance (T). The function uses the plane data for the two other planes (OppNormal0, OppNormal1) to compute two barycentric weights (baryX, baryY) of the new intersection point (PointOnPlane). From the two barycentric weights (baryX, baryY), the function computes the third barycentric weight (baryZ) as 1.0-baryX-baryY, since the sum of three barycentric weights is 1.

Then, the function checks if each of the three barycentric weights (baryX, baryY, baryZ) is greater than zero, which indicates the new intersection point (PointOnPlane) is inside the tested triangle. If so, the function updates the input/output parameters that indicate the closest intersection point so far (ClosestTriangle, ClosestT, and ClosestBary) to be the triangle ID (TriangleID), distance T, and two barycentric weights of the new intersection point, and returns the Boolean value true. Otherwise (intersection point is not inside the tested triangle), the function returns the Boolean value false.

FIGS. 16e-16h show code listings (1605-1608) for functions that can be used when triangles are two-sided, and back-face culling operations can be omitted.

FIGS. 16e and 16f show a function TestTriangleTwoSided( ) that is the same as the function TestTriangleOneSided( ) as shown in FIGS. 16a and 16b, except as follows. The function TestTriangleTwoSided( ) does not return a Boolean value that indicates success or failure. Instead, the function TestTriangleTwoSided( ) simply returns early under various conditions, as shown in FIG. 16e. Also, the function TestTriangleTwoSided( ) does not determine a bit that indicates whether a face is reversed. Instead, the variable Denom is simply compared to the threshold (EPSILON) when checking if the tested triangle is back-facing.

The function TestRayTetrahedronIntersection_NoBackfaceCulling( ) in the code listings (1607-1608) of FIGS. 16g and 16h has the same parameters as the function TestRayTetrahedronIntersection_CullBack-faces( ) but the flow of operations is slightly different. The function TestRayTetrahedronIntersection_NoBack-faceCulling( ) calls the function TestTriangleTwoSided( ) passing the input/output parameters that indicate the closest intersection point so far (TriangleHit, ClosestT, and ClosestBary), the parameters that specify the ray (RayOrigin, RayDirection), the triangle ID of the triangle to be tested (Triangle1ID), the normal vector of the plane that includes the triangle to be tested (FaceNormal1), and the normal vectors of the two bounding planes for the triangle to be tested (FaceNormal2, FaceNormal3). The ray can possibly intersect more than one of the triangles. After the call to TestTriangleTwoSided( ) returns, the triangle ID of the second triangle is checked. If it is zero, TestRayTetrahedronIntersection_NoBack-faceCulling( ) ends. Otherwise, the function tests the second triangle. The function calls TestTriangleTwoSided( ) passing the input/output parameters that indicate the closest intersection point so far (TriangleHit, ClosestT, and ClosestBary), the parameters that specify the ray (RayOrigin, RayDirection), the triangle ID of the triangle to be tested (Triangle2ID), the normal vector of the plane that includes the triangle to be tested (FaceNormal2), and the normal vectors of the two bounding planes for the triangle to be tested (FaceNormal3, FaceNormal1). After the call to TestTriangleTwoSided( ) returns, the triangle ID of the third triangle is checked. If it is zero, the function TestRayTetrahedronIntersection_Cull- Back-faces( ) ends. Otherwise, the function tests the third triangle. The function calls TestTriangleTwoSided( ) passing the input/output parameters that indicate the closest intersection point so far (TriangleHit, ClosestT, and ClosestBary), the parameters that specify the ray (RayOrigin, RayDirection), the triangle ID of the triangle to be tested (Triangle3ID), the normal vector of the plane that includes the triangle to be tested (FaceNormal3), and the normal vectors of the two bounding planes for the triangle to be tested (FaceNormal1, FaceNormal2).

VI. Alternatives and Variations

For a closed tetrahedral cluster, ray-triangle testing can be performed for up to four triangles that define faces of the tetrahedral cluster. Each face plane of the tetrahedral cluster can be used to compute the barycentric weight of the opposite vertex in the tetrahedral cluster. The barycentric weight of the opposite vertex can then be used as one of the barycentric weights for each of the other three triangles of the tetrahedral cluster, which contain that opposite vertex.

Approaches described herein for ray-triangle intersection testing can, more generally, be applied for testing for intersections between a ray and polygon.

Further, different embodiments may include one or more of the inventive features shown in the following table of features.

| | |
|---|---|
| A | Scaling planes in plane data for simplified ray-triangle intersection testing |
| A1 | In a computer system, a method of testing for ray-triangle intersections during ray tracing in a computer-represented environment that includes multiple triangles, the method comprising: selecting a triangle in a cluster; constructing one or more non-coplanar planes for the cluster, each of the one or more non-coplanar planes sharing an edge with the selected triangle; scaling a plane that includes the selected triangle by a scaling factor based on a distance between the plane that includes the selected triangle and a vertex that is in the cluster but not in the selected triangle; using plane data for the plane that includes the selected triangle to determine an intersection point between a ray and the plane that includes the selected triangle; using plane data for the one or more non-coplanar planes for the cluster to compute barycentric weights of the intersection point; and using the barycentric weights to determine if the intersection point is inside the selected triangle. |
| A2 | The method of A1, wherein the scaling factor makes the distance between the plane that includes the selected triangle and the vertex that is in the cluster but not in the selected triangle equal to 1. |
| A3 | The method of A1, further comprising: scaling each of the one or more non-coplanar planes by a scaling factor based on a distance between the non-coplanar plane and a vertex that is in the cluster but not in the non-coplanar plane. |
| A4 | The method of A1, wherein the plane data for the plane that includes the selected triangle and the one or more non-coplanar planes includes, for each plane, a normal of the plane and a distance from a world origin to the plane. |
| A5 | The method of A1, wherein the plane data for the plane that includes the selected triangle and the one or more non-coplanar planes includes a vertex in the cluster and, for each plane, a normal of the plane. |
| B | Using plane data for ray-triangle intersection testing |
| B1 | In a computer system, a method of testing for ray-triangle intersections during ray tracing in a computer-represented environment that includes multiple triangles, the method comprising: selecting a triangle; using plane data for a face plane that includes the selected triangle to determine an intersection point between a ray and the face plane; using plane data for multiple side planes to compute barycentric weights of the intersection point, each of the multiple side planes including an edge of the selected triangle; and using the barycentric weights to determine if the intersection point is inside the selected triangle. |
| B2 | The method of B1, wherein the face plane and multiple side planes include faces of a tetrahedral cluster. |
| B3 | The method of B1, wherein the plane data for the face plane and the side planes includes, for each plane, a normal of the plane and a distance from a world origin to the plane. |
| B4 | The method of B1, wherein the plane data for the face plane and the side planes includes a vertex shared between the face plane and the side planes and further includes, for each plane, a normal of the plane. |
| B5 | The method of B1, wherein the computer system includes multiple processing units, and wherein the method is performed for different rays in parallel with different threads of a given processing unit of the multiple processing units. |
| B6 | The method of B5, wherein the given processing unit is a graphics processing unit. |
| C | Scaling planes in plane data for simplified ray-polygon intersection testing |
| C1 | In a computer system, a method of testing for ray-polygon intersections |

-continued during ray tracing in a computer-represented environment that includes multiple polygons, the method comprising:
selecting a polygon in a cluster;
constructing one or more non-coplanar planes for the cluster, each of the one or more non-coplanar planes sharing an edge with the selected polygon;
scaling a plane that includes the selected polygon by a scaling factor based on a distance between the plane that includes the selected polygon and a vertex that is in the cluster but not in the selected polygon;
using plane data for the plane that includes the selected polygon to determine an intersection point between a ray and the plane that includes the selected polygon;
using plane data for the one or more non-coplanar planes for the cluster to compute barycentric weights of the intersection point; and
using the barycentric weights to determine if the intersection point is inside the selected polygon.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. One or more computer-readable media storing computer-executable instructions for causing a computer system, when programmed thereby, to perform operations to test for ray-triangle intersections during ray tracing in a computer-represented environment that includes multiple triangles, the operations comprising:
   selecting multiple non-coplanar adjacent triangles in a tetrahedral cluster, wherein a different plane, among a set of planes of the tetrahedral cluster, includes each of the selected triangles; and
   using plane data for the set of planes of the tetrahedral cluster to determine intersection points and barycentric weights for the selected triangles, including, for each of the selected triangles:
      using plane data for the plane that includes the selected triangle to determine an intersection point between a ray and the plane that includes the selected triangle;
      using plane data for other planes in the set of planes of the tetrahedral cluster to compute barycentric weights of the intersection point; and
      using the barycentric weights to determine if the intersection point is inside the selected triangle.

2. The one or more computer-readable media of claim 1, wherein, for each plane of the set of planes of the tetrahedral cluster, the plane is scaled by a scaling factor based on a distance between the plane and a vertex that is in the tetrahedral cluster but not in the plane.

3. The one or more computer-readable media of claim 2, wherein the scaling factor makes the distance between the plane and the vertex that is in the tetrahedral cluster but not in the plane equal to 1.

4. The one or more computer-readable media of claim 1, wherein any two of the selected triangles share at least one edge of the tetrahedral cluster, wherein the selected triangles define at least some faces of the tetrahedral cluster, and wherein none of the planes of the set of planes of the tetrahedral cluster are parallel to each other.

5. The one or more computer-readable media of claim 1, wherein the plane data for the set of planes of the tetrahedral cluster includes, for each plane in the set of planes of the tetrahedral cluster, a normal of the plane and a distance from a world origin to the plane.

6. The one or more computer-readable media of claim 5, wherein:
   the using the plane data for the plane that includes the selected triangle to determine the intersection point includes:
      computing a distance from an origin of the ray to the intersection point based on (1) the distance from the world origin to the plane that includes the selected triangle, (2) a dot product of (a) the normal of the plane that includes the selected triangle and (b) the origin of the ray, and (3) a dot product of (a) the normal of the plane that includes the selected triangle and (b) a direction of the ray;
      checking if the intersection point is behind the origin of the ray or if the selected triangle is back-facing; and
      computing the intersection point based on the origin of the ray, the direction of the ray, and the distance from the origin of the ray to the intersection point; and
   the using the plane data for other planes in the set of planes of the tetrahedral cluster to compute barycentric weights of the intersection point includes:
      computing a first weight of the barycentric weights based on (1) the distance from the world origin to a first other plane of the other planes, and (2) a dot product of (a) the normal of the first other plane and (b) the intersection point; and
      computing a second weight of the barycentric weights based on (1) the distance from the world origin to a second other plane of the other planes, and (2) a dot product of (a) the normal of the second other plane and (b) the intersection point.

7. The one or more computer-readable media of claim 1, wherein the plane data for the set of planes of the tetrahedral cluster includes a vertex in the tetrahedral cluster and, for each plane in the set of planes of the tetrahedral cluster, a normal of the plane.

8. The one or more computer-readable media of claim 7, wherein:
   the operations further comprise adjusting an origin of the ray by subtracting the vertex;
   the using the plane data for the plane that includes the selected triangle to determine the intersection point includes:
      computing a distance from the origin of the ray to the intersection point based on (1) a dot product of (a) the normal of the plane that includes the selected triangle and (b) the origin of the ray, and (2) a dot product of (a) the normal of the plane that includes the selected triangle and (b) a direction of the ray;
checking if the intersection point is behind the origin of the ray or if the selected triangle is back-facing; and
computing the intersection point based on the origin of the ray, the direction of the ray, and the distance from the origin of the ray to the intersection point; and
the using the plane data for other planes in the set of planes of the tetrahedral cluster to compute barycentric weights of the intersection point includes:
computing a first weight of the barycentric weights based on a dot product of (a) the normal of a first other plane of the other planes and (b) the intersection point; and
computing a second weight of the barycentric weights based on a dot product of (a) the normal of a second other plane of the other planes and (b) the intersection point.

9. The one or more computer-readable media of claim 1, wherein:
two triangles are selected and, for a given one of the two selected triangles, the other planes include (1) a first other plane that includes the other selected triangle, and (2) a second other plane that includes a non-selected triangle having an edge from each of the two selected triangles; or
three triangles are selected and, for a given one of the three selected triangles, the other planes are planes that include the other two selected triangles.

10. The one or more computer-readable media of claim 1, wherein the operations further comprise, for each of the selected triangles:
receiving a flag that indicates whether the selected triangle and the plane that includes the selected triangle face the same direction; and
using the flag when checking if the selected triangle is back-facing.

11. The one or more computer-readable media of claim 1, wherein the set of planes of the tetrahedral cluster is a set of three planes, and wherein the three planes are:
if three triangles are selected, the planes that include the three selected triangles, respectively; and
if only two triangles are selected, the planes that include the two selected triangles, respectively, and another plane that includes a non-selected triangle having an edge from each of the two selected triangles.

12. In a computer system, a method of pre-processing plane data for ray tracing in a computer-represented environment that includes multiple triangles, the method comprising:
identifying multiple non-coplanar adjacent triangles in a tetrahedral cluster, wherein a different plane, among a set of planes of the tetrahedral cluster, includes each of the identified triangles;
for each plane of the set of planes of the tetrahedral cluster, scaling the plane by a scaling factor based on a distance between the plane and a vertex that is in the tetrahedral cluster but not in the plane;
representing the tetrahedral cluster using plane data for the set of planes of the tetrahedral cluster; and
storing the plane data for the set of planes of the tetrahedral cluster.

13. The method of claim 12, wherein the scaling factor makes the distance between the plane and the vertex that is in the tetrahedral cluster but not in the plane equal to 1.

14. The method of claim 12, wherein any two of the identified triangles share at least one edge of the tetrahedral cluster, wherein the identified triangles define at least some faces of the tetrahedral cluster, and wherein none of the planes of the set of planes of the tetrahedral cluster are parallel to each other.

15. The method of claim 12, wherein the plane data for the set of planes of the tetrahedral cluster includes:
for each plane of the set of planes of the tetrahedral cluster, a normal of the plane;
a vertex in the tetrahedral cluster or, for each plane of the set of planes of the tetrahedral cluster, a distance from a world origin to the plane; and
zero or more of unique triangle identifiers ("IDs") for the identified triangles and property values for the identified triangles or vertices of the identified triangles.

16. The method of claim 12, further comprising, for each of the identified triangles:
determining whether the identified triangle and the plane that includes the identified triangle face the same direction; and
setting a flag that indicates whether the identified triangle and the plane that includes the identified triangle face the same direction.

17. The method of claim 12, wherein the set of planes of the tetrahedral cluster are:
if three triangles are identified, the planes that include the three identified triangles respectively; and
if only two triangles are identified, the planes that include the two identified triangles, respectively, and another plane that includes a non-identified, notional triangle having an edge from each of the two identified triangles.

18. The method of claim 12, further comprising, as part of the identifying the multiple non-coplanar adjacent triangles:
determining whether two adjacent triangles, having an angle between them, are at least substantially coplanar based at least in part on a comparison of the angle to a threshold angle; or
for one of the identified triangles, determining whether adjacent triangles are at least substantially coplanar based at least in part on a comparison of (a) a threshold distance and (b) a distance from the plane that includes the identified triangle to a vertex that is in the tetrahedral cluster but not in the identified triangle.

19. A system comprising:
a buffer configured to store plane data for a set of planes of a tetrahedral cluster; and
a ray tracing tool configured to test for ray-triangle intersections by performing operations that include:
selecting multiple non-coplanar adjacent triangles in the tetrahedral cluster, wherein a different plane, among the set of planes of the tetrahedral cluster, includes each of the selected triangles in the tetrahedral cluster; and
using plane data for the set of planes of the tetrahedral cluster to determine intersection points and barycentric weights for the selected triangles, including, for each of the selected triangles:
using plane data for the plane that includes the selected triangle to determine an intersection point between a ray and the plane that includes the selected triangle;
using plane data for other planes in the set of planes of the tetrahedral cluster to compute barycentric weights of the intersection point; and
using the barycentric weights to determine if the intersection point is inside the selected triangle.

20. The system of claim 19, wherein for each plane of the set of planes of the tetrahedral cluster, the plane is scaled by a scaling factor based on a distance between the plane and a vertex that is in the tetrahedral cluster but not in the plane.

21. The system of claim 19, wherein the plane data for the set of planes of the tetrahedral cluster includes, for each plane in the set of planes of the tetrahedral cluster, a normal of the plane and a distance from a world origin to the plane.

22. The system of claim 19, wherein the plane data for the set of planes of the tetrahedral cluster includes a vertex in the tetrahedral cluster and, for each plane in the set of planes of the tetrahedral cluster, a normal of the plane.

23. The system of claim 19, wherein the operations further comprise, for each of the selected triangles:

receiving a flag that indicates whether the selected triangle and the plane that includes the selected triangle face the same direction; and using the flag when checking if the selected triangle is back-facing.

24. One or more computer-readable media storing computer-executable instructions for causing a computer system, when programmed thereby, to perform operations to pre-process plane data for ray tracing in a computer-represented environment that includes multiple triangles, the operations comprising:

identifying multiple non-coplanar adjacent triangles in a tetrahedral cluster, wherein a different plane, among a set of planes of the tetrahedral cluster, includes each of the identified triangles;

for each of the identified triangles:
  determining whether the identified triangle and the plane that includes the identified triangle face the same direction; and
  setting a flag that indicates whether the identified triangle and the plane that includes the identified triangle face the same direction;

representing the tetrahedral cluster using plane data for the set of planes of the tetrahedral cluster; and storing the plane data for the set of planes of the tetrahedral cluster.

25. The one or more computer-readable media of claim 24, wherein the plane data for the set of planes of the tetrahedral cluster includes:

for each plane of the set of planes of the tetrahedral cluster, a normal of the plane;

a vertex in the tetrahedral cluster or, for each plane of the set of planes of the tetrahedral cluster, a distance from a world origin to the plane; and zero or more of unique triangle identifiers ("IDs") for the identified triangles and property values for the identified triangles or vertices of the identified triangles.

* * * * *